United States Patent [19]
Johnson et al.

[11] Patent Number: 5,957,714
[45] Date of Patent: Sep. 28, 1999

[54] MODULAR COMMUNICATION SYSTEM

[75] Inventors: Ross Johnson, Ottawa; Harold R. Wilson, Hudsonville, both of Mich.

[73] Assignee: Haworth Inc., Holland, Mich.

[21] Appl. No.: 08/896,451

[22] Filed: Jul. 18, 1997

Related U.S. Application Data

[63] Continuation of application No. 08/755,030, Nov. 22, 1996, abandoned, which is a continuation of application No. 08/377,915, Jan. 25, 1995, abandoned.

[51] Int. Cl.$^6$ .................................................. H01R 23/27
[52] U.S. Cl. .......................................... 439/215; 439/225
[58] Field of Search .................. 439/215, 211, 439/210, 188, 225; 174/48

[56] References Cited

U.S. PATENT DOCUMENTS

| | | | |
|---|---|---|---|
| 3,781,758 | 12/1973 | Anderson | 379/397 |
| 3,958,850 | 5/1976 | Ayer . | |
| 3,990,763 | 11/1976 | Kress | 379/397 |
| 4,060,294 | 11/1977 | Haworth et al. | 439/215 |
| 4,070,548 | 1/1978 | Kasper | 379/397 |
| 4,103,985 | 8/1978 | Krolak et al. . | |
| 4,115,665 | 9/1978 | Giacoppo et al. | 379/397 |
| 4,220,391 | 9/1980 | Krolak et al. | 379/397 |
| 4,227,764 | 10/1980 | Fiske . | |
| 4,236,779 | 12/1980 | Tang | 379/397 |
| 4,262,173 | 4/1981 | Saligny | 379/397 |
| 4,277,123 | 7/1981 | Haworth et al. | 439/215 |
| 4,290,664 | 9/1981 | Davis et al. | 379/397 |
| 4,392,701 | 7/1983 | Weidler | 379/397 |
| 4,408,819 | 10/1983 | Guelden | 379/397 |
| 4,533,202 | 8/1985 | Pohl | 379/397 |
| 4,602,842 | 7/1986 | Free et al. | 379/397 |
| 4,662,701 | 5/1987 | Lane | 379/397 |
| 4,761,811 | 8/1988 | Zetena, Jr. | 379/397 |
| 4,829,564 | 5/1989 | Jarvis | 439/540 |
| 4,850,899 | 7/1989 | Maynard | 439/638 |
| 4,909,757 | 3/1990 | Reed | 439/532 |
| 4,928,303 | 5/1990 | Allin et al. | 379/93 |
| 4,932,051 | 6/1990 | Karan et al. | 379/399 |

(List continued on next page.)

FOREIGN PATENT DOCUMENTS

| | | |
|---|---|---|
| 2 609 218 | 7/1988 | France . |
| 4162898 | 8/1992 | Japan . |
| 6251847 | 9/1994 | Japan . |

OTHER PUBLICATIONS

Brand–Rex Cable Assemblies, BRIntec Corporation, Brand–Rex Telecommunications Systems Division, May 1986 (2 pages).

*Primary Examiner*—Gary Paumen
*Attorney, Agent, or Firm*—Flynn, Thiel, Boutell & Tanis, P.C.

[57] ABSTRACT

A modular communication system, particularly for interior space-dividing wall panels which are serially connected together to define a plurality of adjacent workstations. The modular communication system is defined by a plurality of prefabricated modules, one of which is an elongate main distribution module mountable within a raceway which extends horizontally longitudinally of the panel. This elongate main distribution module, in one embodiment, has a length which approximately corresponds to the panel length, and has terminals or connectors at opposite ends so that a plurality of main distribution modules can be serially connected to extend along a plurality of serially-connected panels. The main communication modules define a plurality of telecommunication links (i.e., paths), with each link preferably being defined by eight conductors (i.e., four pairs). The system also includes tap-off modules which cooperate with the main communication modules to permit one (two in the preferred embodiment) link to be tapped off at a workstation for connection to communication equipment (i.e. a telephone and/or a computer). The tap-off module permits only the selected link or links to be tapped off and accessible at the workstation.

39 Claims, 31 Drawing Sheets

U.S. PATENT DOCUMENTS

| | | | |
|---|---|---|---|
| 4,992,058 | 2/1991 | Tanner | 439/211 |
| 5,070,522 | 12/1991 | Nilssen | 379/90 |
| 5,096,433 | 3/1992 | Boundy | 439/215 |
| 5,149,277 | 9/1992 | LeMaster | 439/207 |
| 5,158,472 | 10/1992 | Juhlin | 439/215 |
| 5,160,276 | 11/1992 | Marsh et al. | 439/502 |
| 5,203,713 | 4/1993 | French et al. | 439/215 |
| 5,210,788 | 5/1993 | Nilssen | 379/61 |
| 5,214,889 | 6/1993 | Nienhuis et al. | 439/439 |
| 5,236,370 | 8/1993 | King et al. | 439/215 |
| 5,252,086 | 10/1993 | Russell et al. | 439/215 |
| 5,272,277 | 12/1993 | Humbles et al. | 174/48 |
| 5,277,609 | 1/1994 | Ondrejka | 439/211 |
| 5,299,956 | 4/1994 | Brownell et al. | 439/638 |
| 5,318,454 | 6/1994 | Deer et al. | 439/215 |
| 5,326,934 | 7/1994 | LeMaster et al. | 174/59 |
| 5,412,529 | 5/1995 | Eaton et al. | 361/90 |
| 5,719,933 | 2/1998 | Welch | 439/638 |

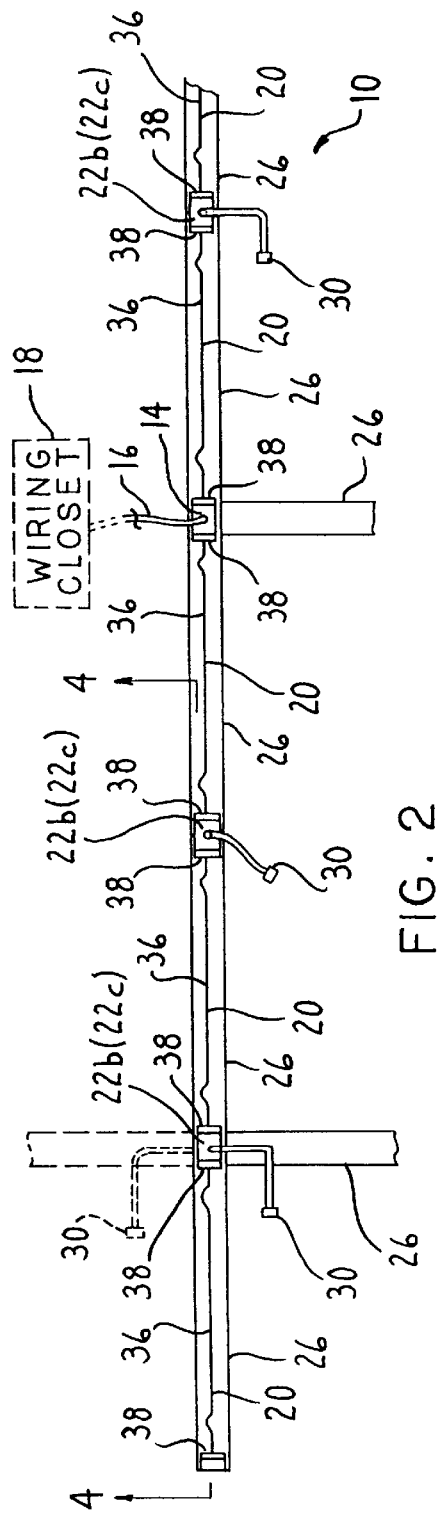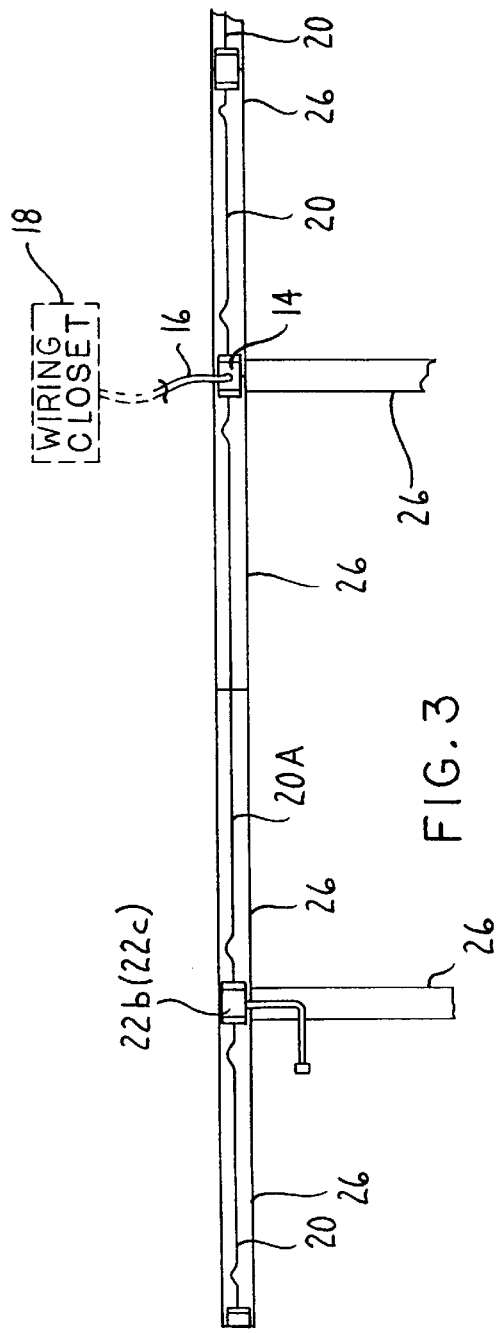

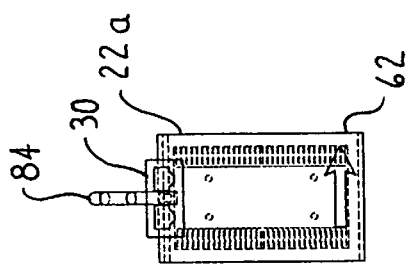
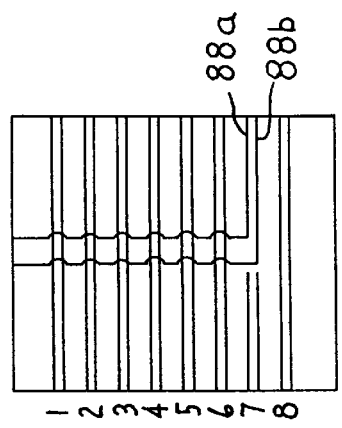
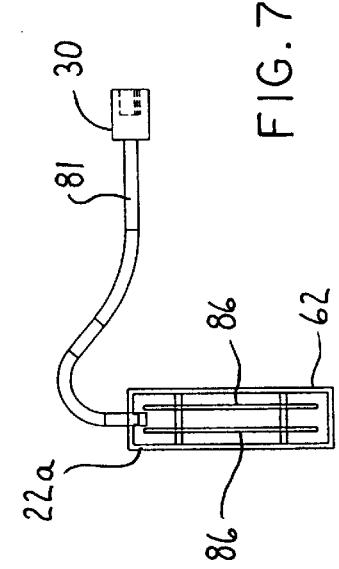
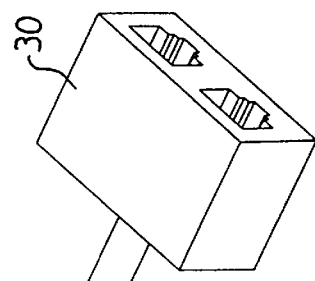
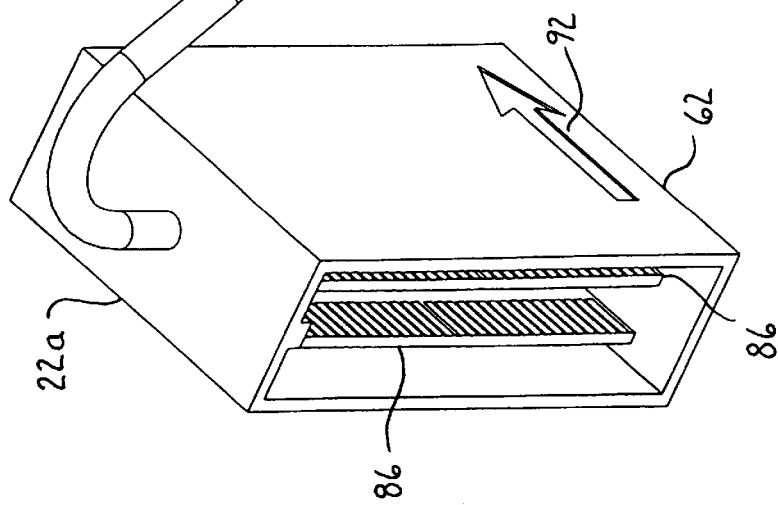

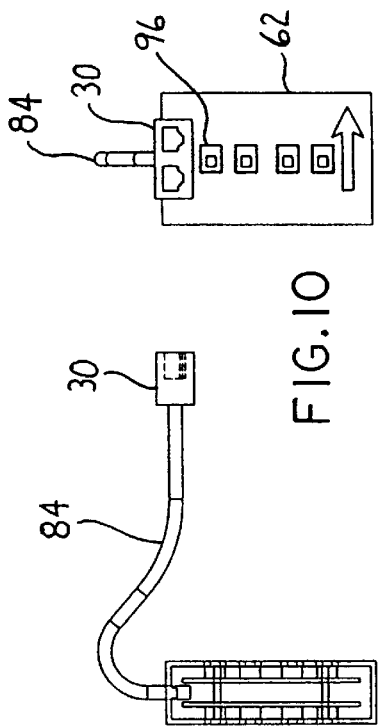
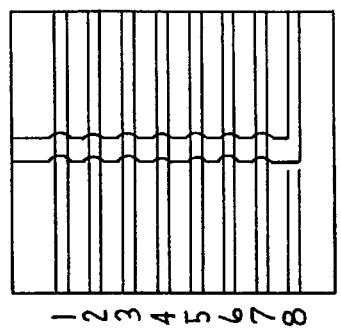
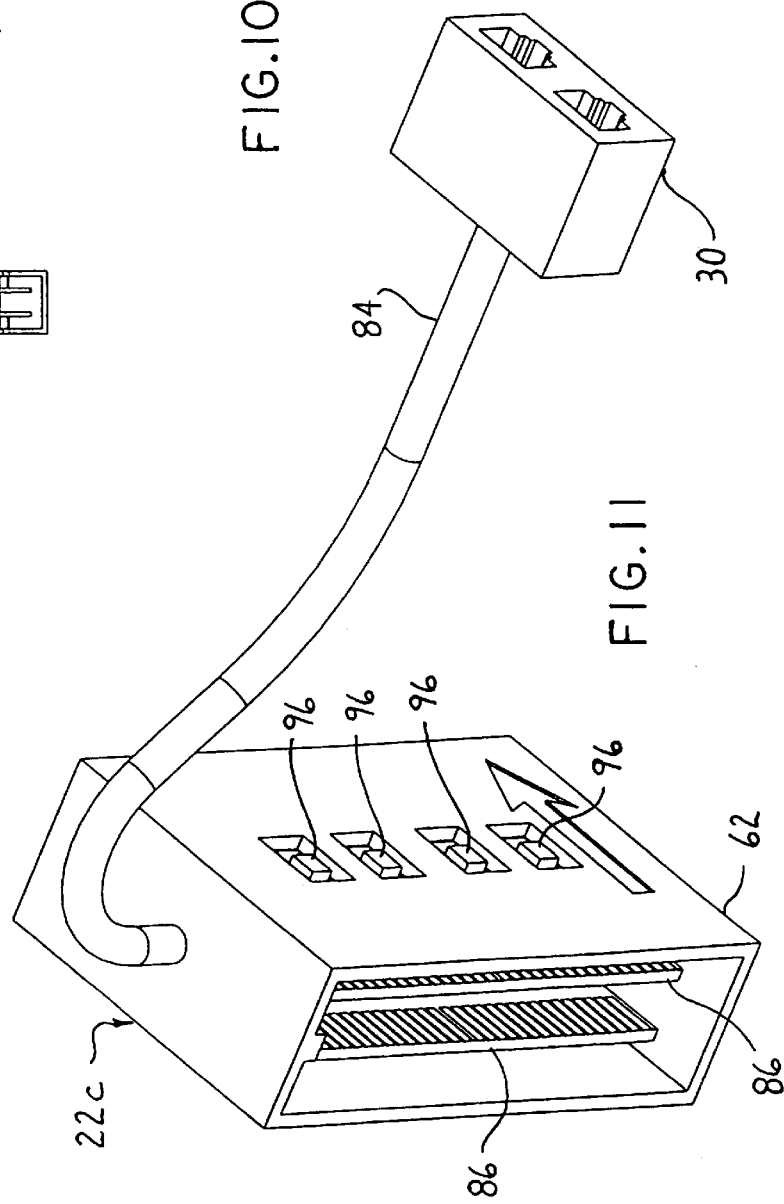

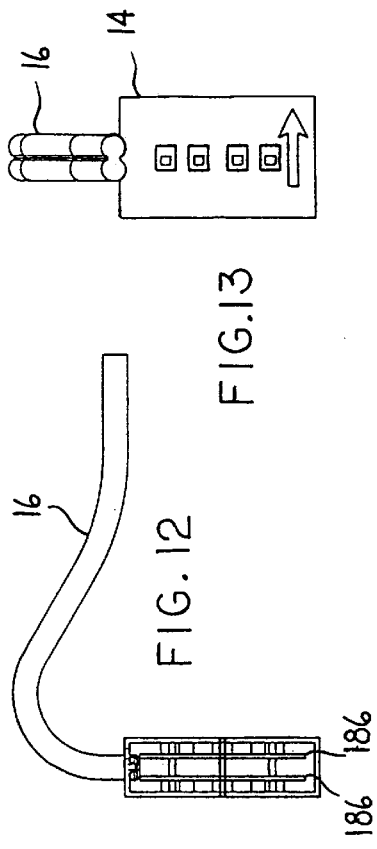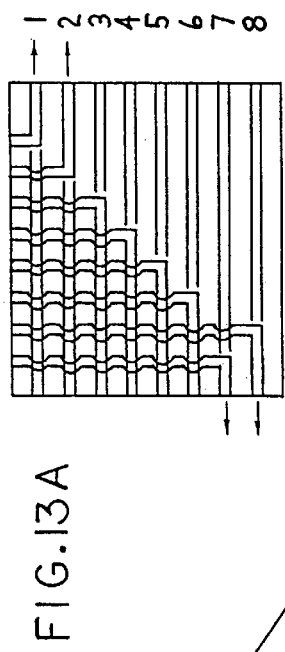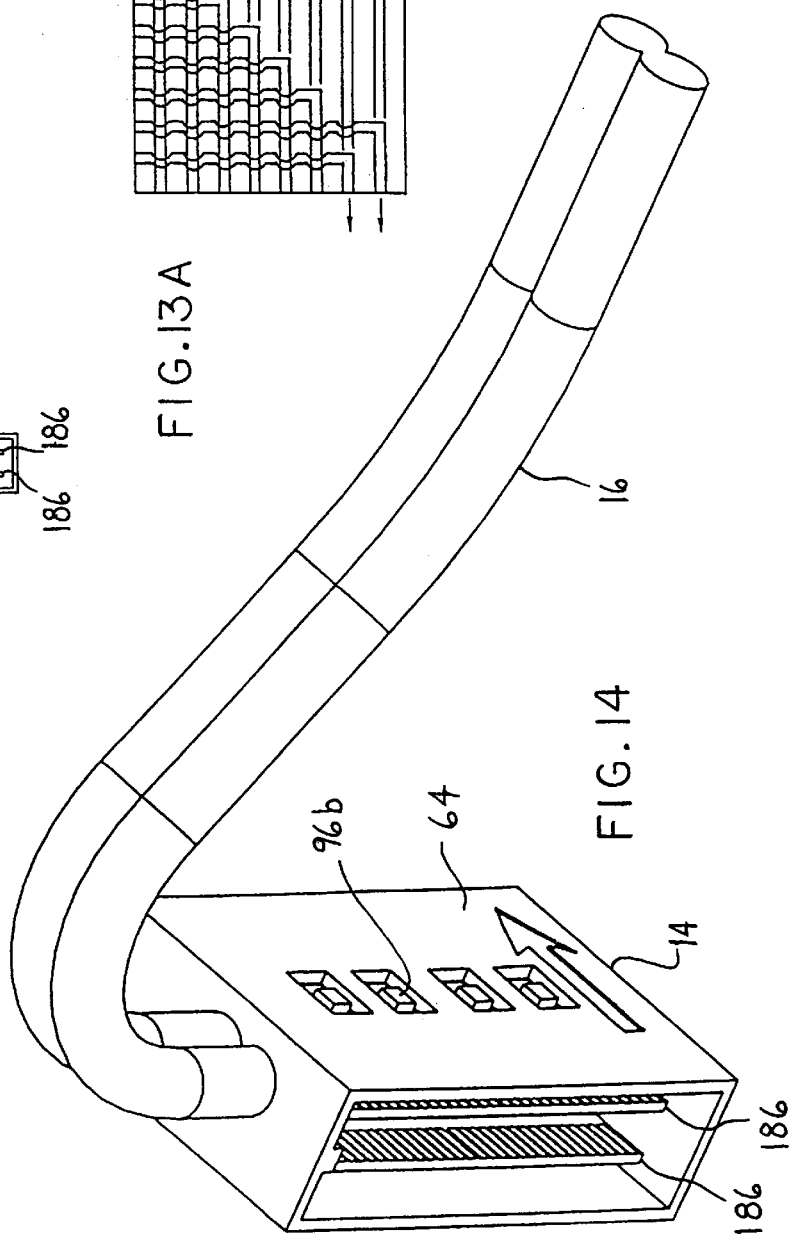

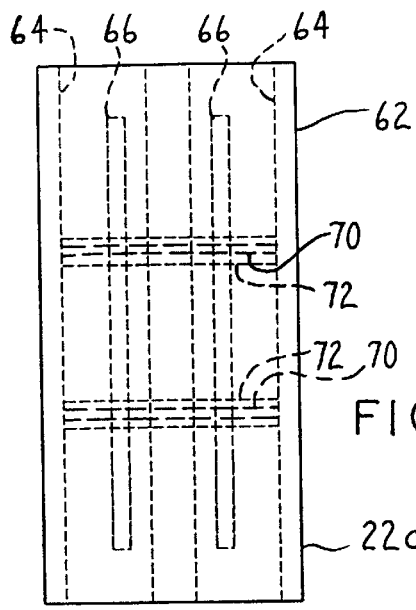
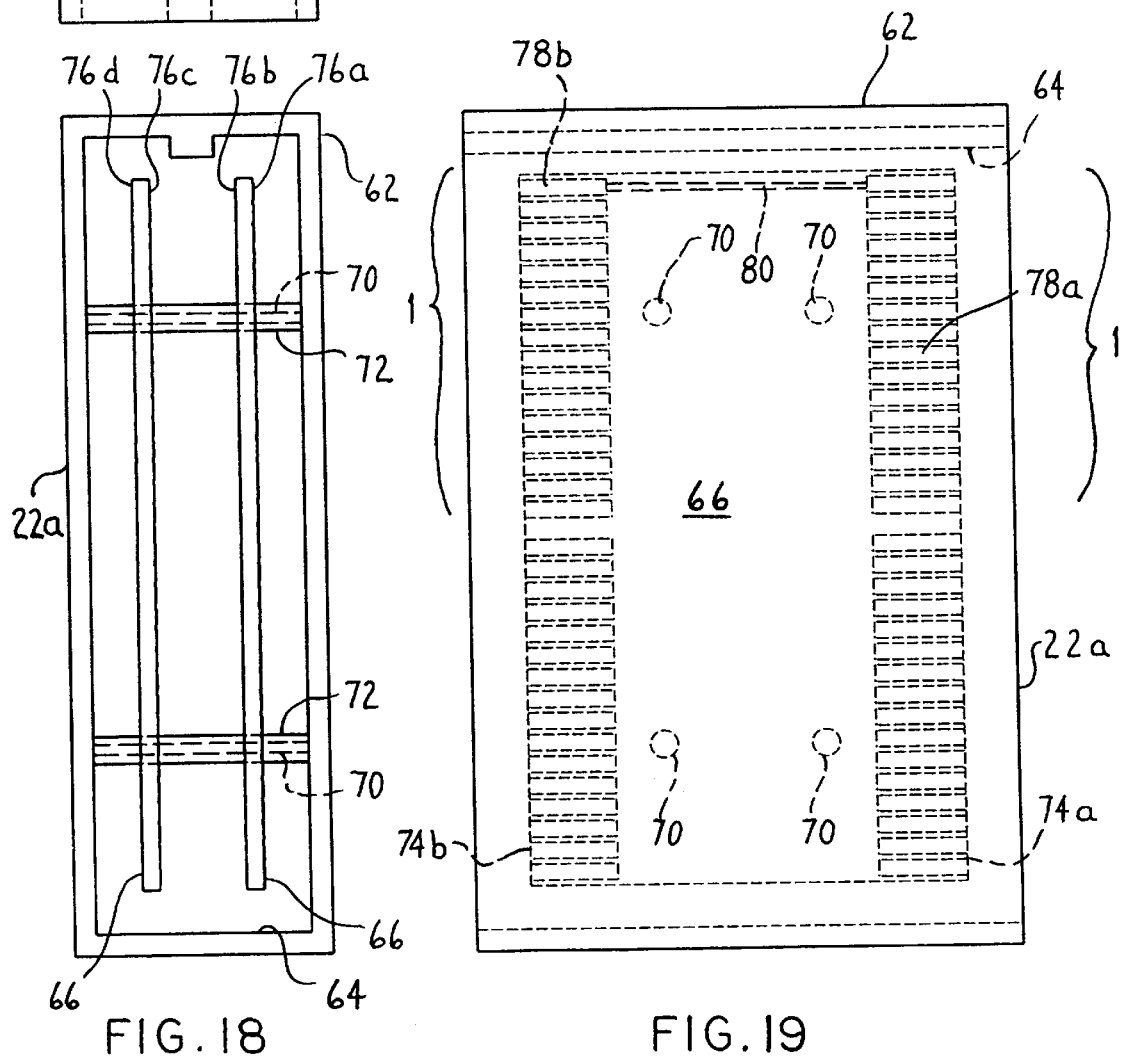
FIG. 17
FIG. 18
FIG. 19

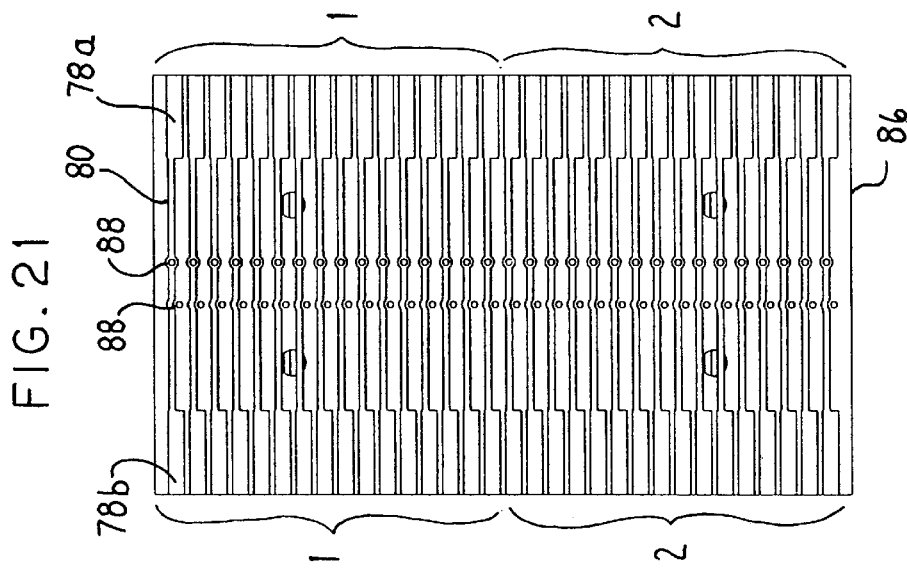
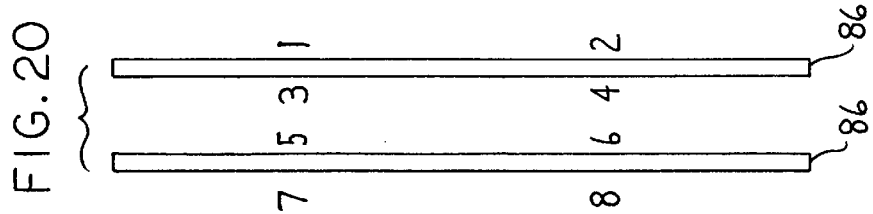
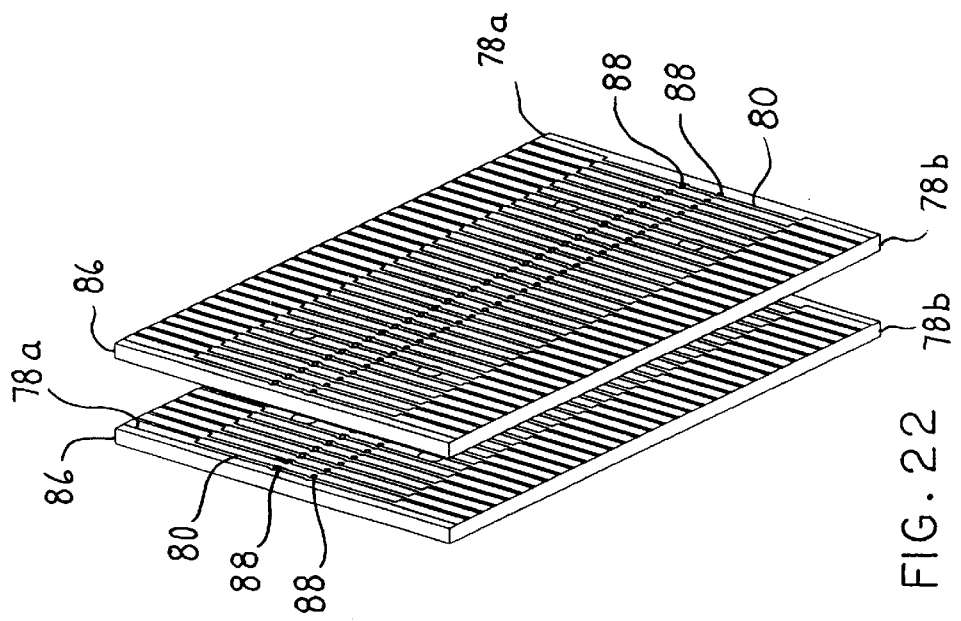

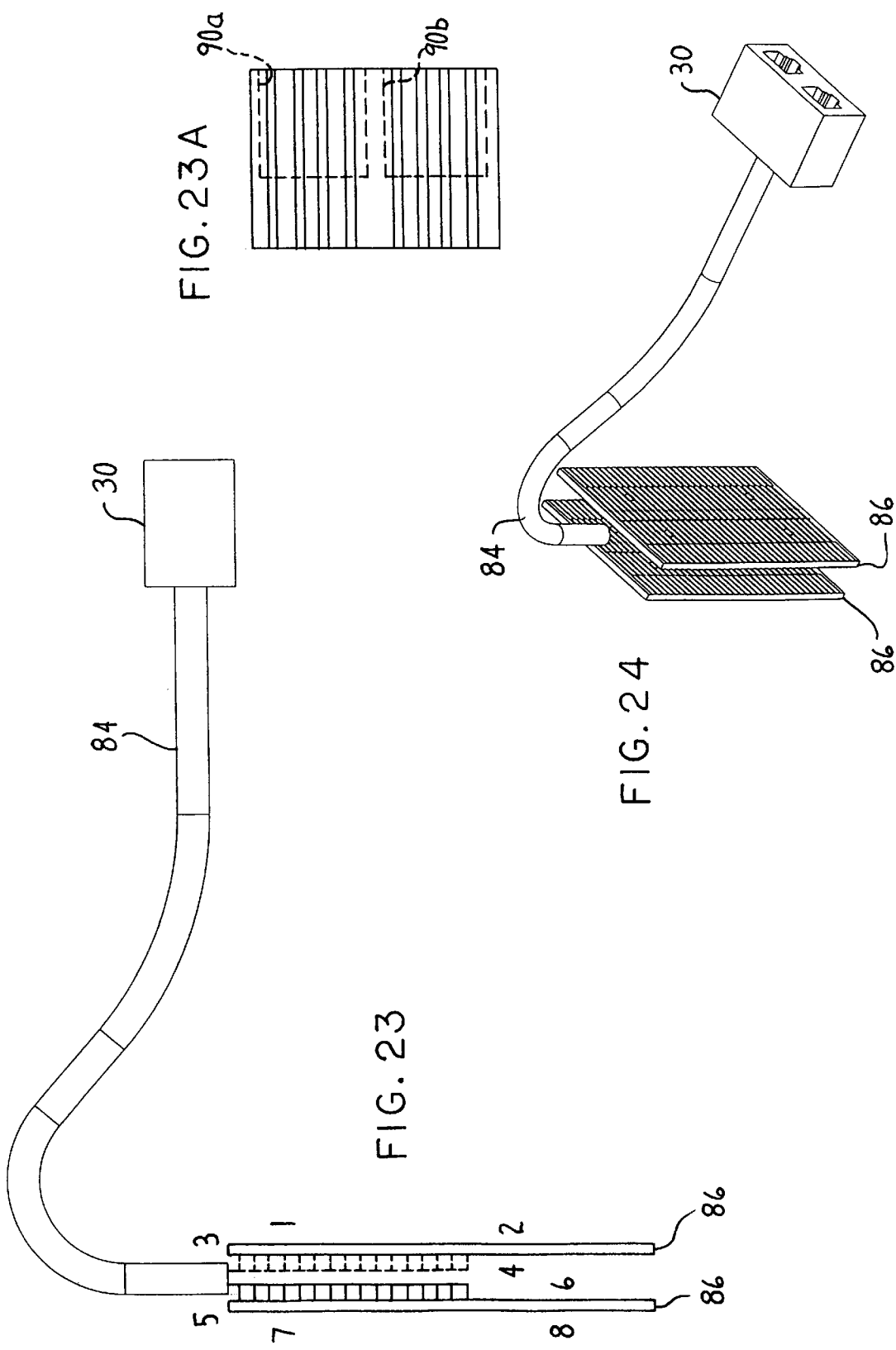

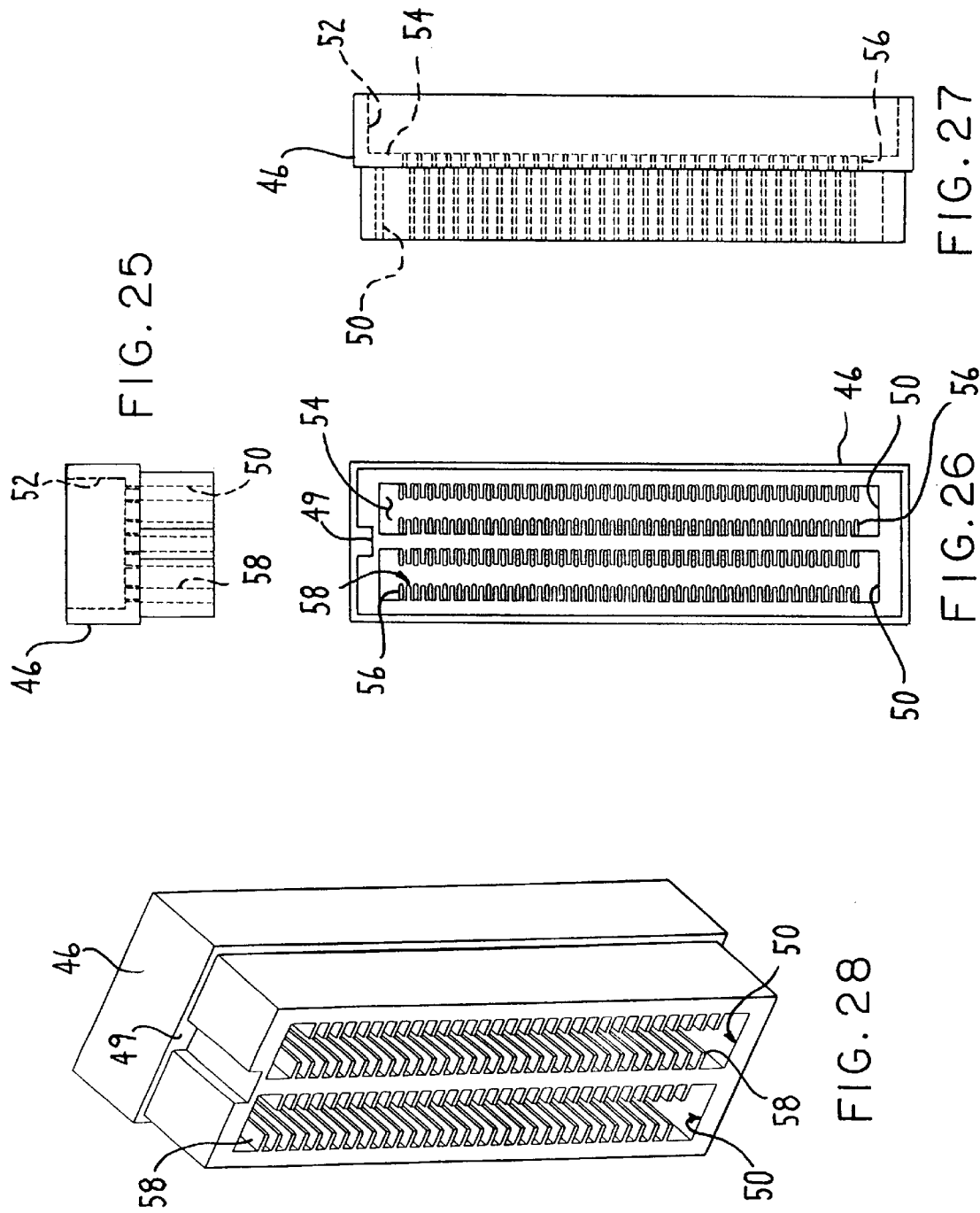

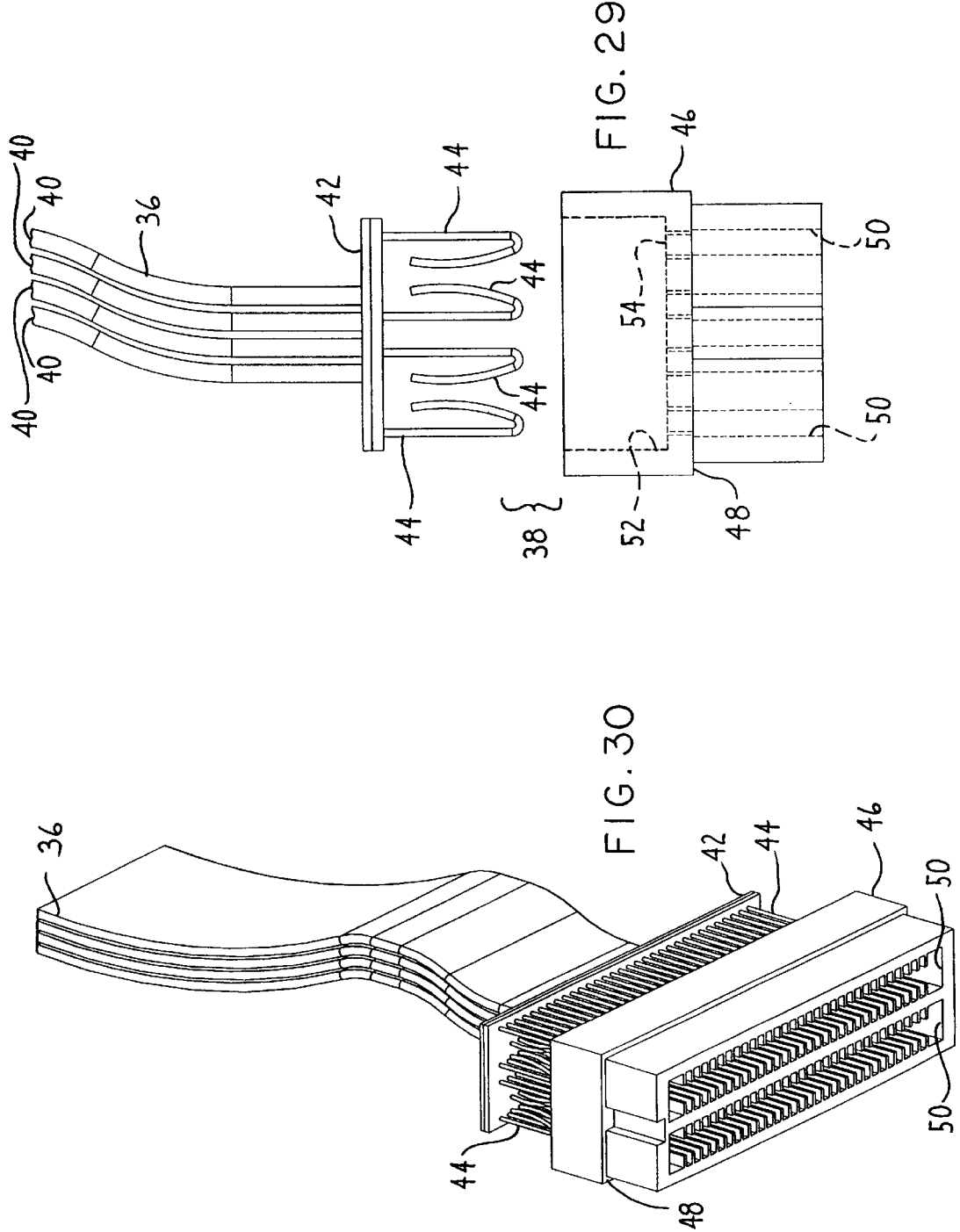

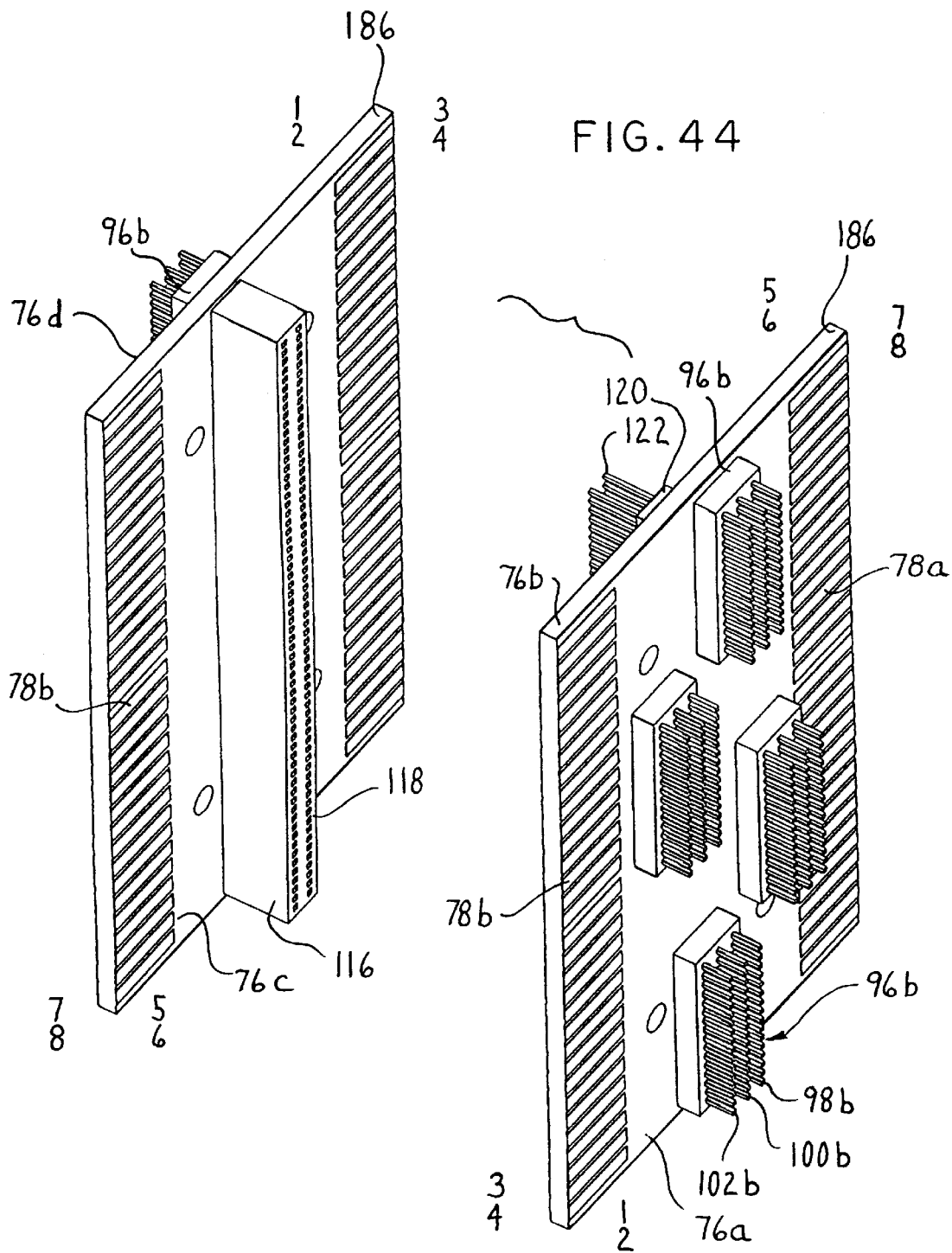

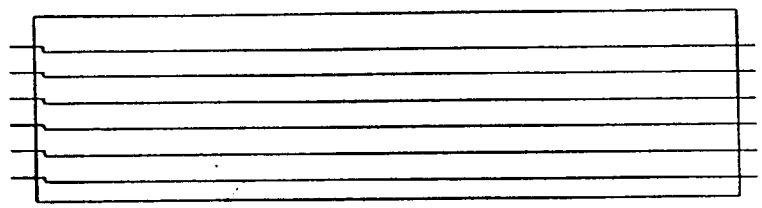
FIG.49B
FIG.49A
QC   DDS   QC
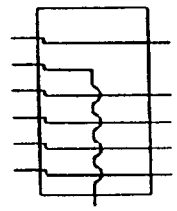
FIG.50B
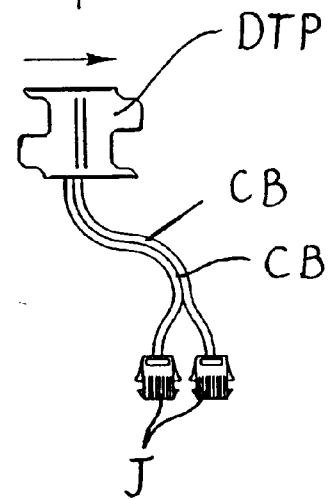
FIG.50A
DTP
CB
CB
J

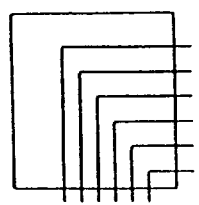
FIG.53B

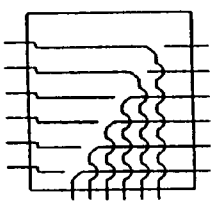
FIG.54B
FIG.54A

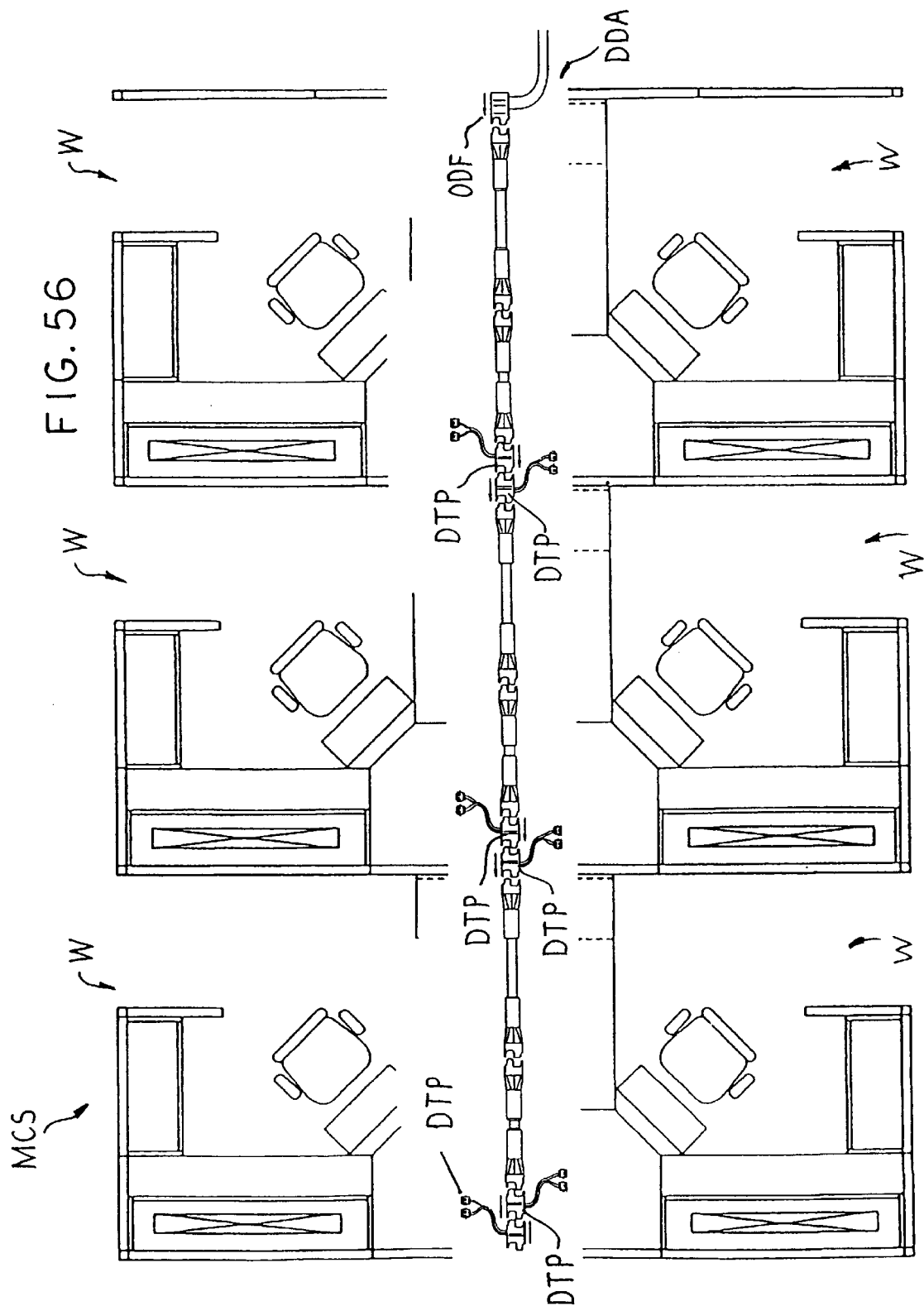

MODULAR COMMUNICATION SYSTEM

This application is a continuation of U.S. Ser. No. 08/755,030, filed Nov. 22, 1996, now abandoned, which is a continuation of U.S. Ser. No. 08/377,915, filed Jan. 25, 1995, now abandoned.

FIELD OF THE INVENTION

This invention relates to a communication cabling system for use within a building and, more specifically, to an improved modular communication cabling system which is desirable for use with office furniture particularly interior space-dividing wall panels to permit a plurality of communication links to be readily supplied to a plurality of workstations to permit selection of links to take place at the workstation, which modular system also significantly simplifies both initial installation and reconfiguration.

BACKGROUND OF THE INVENTION

Commercial buildings typically provide large open floor areas intended for use as offices and the like, and the end user typically determines the most efficient use of the floor space for his own needs, and selects how the floor space is to be divided into smaller working spaces through the use of portable wall panels or the like. To optimize the usage of the space while retaining significant flexibility with respect to such usage and reconfiguration, most modern offices utilize what is conventionally referred to as "systems" furniture for dividing large floor space areas into smaller workstations. This "systems" furniture typically utilizes interior upright space-dividing panels which serially connect together through two-panel straight or angled connections, or through suitable three- or four-panel connections, to define a large plurality of individual workstations. Such panels are typically less than floor-to-ceiling height, and cooperate with other furniture components to define an equipped workstation. These components may involve worksurfaces, file cabinets and the like which mount directly on and are supported by the wall panels, or freestanding furniture components such as tables and file cabinets, and commonly a combination of both wall-mounted and free-standing components are utilized.

These workstations must provide access to both electrical power and communication cabling. The problems associated with the supplying of electrical power to the workstations has been greatly simplified by the development of modular electrical systems which cooperate with and readily mount on the panels, and which can be readily reconfigured, so as to provide significant flexibility and simplicity with respect to the supplying of electrical power to the individual workstations. Such modular electrical systems for use with office furniture, particularly interior space-dividing wall panels, are now conventional and have been extensively utilized for over 15 years. The supplying of communication cables to workstations defined by such panel systems, however, continues to be a formidable problem in the office furniture environment.

More specifically, the conventional and widely utilized practice at the present time is to provide office systems with conventional communication cables which are all connected back to a main wiring closet. That is, a large number of conventional four pair communication cables are connected to control equipment in the wiring closet, and the individual cables are then fed through floor conduits or ceiling clearance spaces to various work areas, at which point the individual cables are then fed into interior channels or raceways which extend along the panels, typically along the tops or bottoms of the panels. Each cable typically terminate in a standard connector, such as a conventional communication jack which mounts in the side of the panel, typically either at the base or at worksurface height. With such arrangement, however, and particularly in view of the extensive use of communication equipment within the work space, which equipment will typically include a telephone, a computer and possibly other equipment such as a facsimile machine, and the additional requirement that computers be interlinked with one another or with a common mainframe, the supplying of communication cables (i.e., communication links) from the wiring closet to the individual workstations creates significant labor and installation difficulties since the large number of cables must typically be installed after the furniture system has been fully assembled at the job site, and the number of such cables and the length thereof as they extend from the wiring closet to the individual workstations create a significant jungle of cables so that initial layout and installation is both time consuming and costly. Further, such systems greatly impede the overall flexibility of the system with respect to hook-up to the various communication links, particularly for computers, and also greatly restricts or at least greatly increases the difficulty of modifying or reconfiguring either the communication system or the furniture system. Any significant modification of either the communication or furniture system requires significant removal of the communication cables and, after the furniture system has been reconfigured, substantially a wholly new installation of the communication cables from the wiring closet to the individual workstations is required. The current communication cabling systems, even though they have been widely utilized for many years and continue to be utilized, nevertheless greatly minimize the advantages associated with furniture systems of this type, particularly with respect to the ability to easily install, modify or reconfigure such furniture systems when provided with a communication system thereon.

To improve on the conventional communication systems currently in use, various attempts have been made to provide at least limited modularity so as to provide some simplification with respect to the installation of communication connections to a plurality of workstations. The current suggestions, however, provide only minor advancements with respect to the problems associated with the current systems and do not provide the degree of selection and flexibility desired or required so as to greatly simplify the installation and the reconfiguration of such systems on furniture, particularly wall panels. The known attempts, to the best of the inventors' knowledge, have not achieved significant commercial acceptance or utilization. Examples of these prior attempts are illustrated in U.S. Pat. Nos. 5,272,277, 5,160,276 and 4,928,303.

Accordingly, it is an object of this invention to provide an improved modular communication system particularly for use on office furniture including wall panels, which improved system overcomes many of the significant problems and disadvantages which are associated with conventional communication cabling systems and which have been tolerated for a long period of time in view of the lack of a desirable solution thereto.

More specifically, it is an object of this invention to provide an improved modular communication cabling system which is particularly desirable for mounting on or within furniture wall panels which define a plurality of workstations, with the modular system incorporating a plurality of communication links which can be selectively tapped off at various workstations to facilitate connection to communication equipment such as telephones, computers and the like.

A further object of the invention is to provide a modular communication system, as aforesaid, which permits prefabrication of a minimal number of modules which make up the system, which modules can be easily and efficiently mounted on the panels and interconnected at the job site so as to greatly simplify the initial installation of the communication system, and at the same time greatly simplify subsequent modification or reconfiguration of either the communication system or of the paneling system. If desired, some of the modules can be mounted on the panels at the factory and shipped to the job site, so that remaining modules are then easily and efficiently installed at the job site so as to interconnect the system.

A still further object of the invention is to provide an improved modular communication system, as aforesaid, which includes modules permitting easy selection of at least one communication link for supply to a workstation, with the selection of the various links of the system and the supplying thereof to the individual workstations being easily and efficiently accomplished at the job site and at the individual workstations after the furniture system has been assembled.

Still a further object of the invention is to provide an improved modular communication system, as aforesaid, which includes the capability of permitting a large plurality of communication links to extend throughout the entire length of the modular system, and which includes a tap-off feature which, when it selects one of the links for tap-off to a selected workstation, causes this link to be dead downstream of the tap-off location.

In addition, it is an object of the invention that such tap-off feature have the capability of permitting any one or more of the grouping of communication links to be tapped off at a particular tap-off location which selection may thereafter be readily changed. It is a further object that such tap-off feature be accomplished by a limited number of different tap-off units.

According to the invention, there is provided an improved modular communication system which is particularly desirable for use on or in association with furniture, and particularly interior space-dividing wall panels which are serially connected together to define a plurality of adjacent workstations. The modular communication system is defined by a plurality of prefabricated modules, one of which is an elongate main distribution module which is mountable within a raceway which is associated with the panel, for example at the bottom thereof, and extends horizontally longitudinally along the panel length. This elongate main distribution module, in one embodiment, has a length which approximately corresponds to the panel length, and additionally has terminals or connectors at opposite ends so that a plurality of such main distribution modules can be serially connected so as to extend along a plurality of serially-connected panels which define a plurality of adjacent workstations. The main communication modules define a plurality of communication links (i.e., paths), with each link preferably being defined by eight conductors (i.e., four pairs) such being a standard and well recognized communication link. The modular communication system also includes tap-off modules which cooperate with the main distribution modules to permit one (two in the preferred embodiment) of the communication links to be tapped off at a workstation so as to permit electronic equipment (such as a telephone and/or a computer) to be joined thereto. The tap-off module cooperates with the system so as to permit only the selected link or links to be tapped off and accessible at the workstation, with the remaining links of the system being transmitted throughout the serially-connected main communication modules for tap-off of other links at other locations or workstations.

In the modular communication system, as aforesaid, the tap-off module and its cooperation with the main communication modules, in a preferred embodiment, enables the installer to make a selection decision as to which link or links will be accessible at the workstation, with these selected links then being dead or disconnected downstream of the tap-off point, thereby simplifying not only the initial installation of the system and the hook-up of equipment within various workstations to different communication links, but also the subsequent reconfiguration of the communication system or of the overall furniture system.

The modular communication system, as aforesaid, also preferably includes an in-feed module which connects to the serially-connected main distribution modules so as to supply the plurality of communication links thereto, with the in-feed having a main trunk cable or the like connected thereto for connection back to the telecommunication closet. The in-feed module can be positioned for cooperation with the main distribution modules to permit some of the plurality of communication links to flow in one downstream direction therefrom, and the other of the plurality of telecommunications links to extend downstream in the opposite direction therefrom.

In the improved modular communication system, in a preferred embodiment as disclosed hereinafter, the system provides 16 telecommunication links which extend throughout the system, and the tap-off preferably accesses two links to facilitate the supplying of two different links to each of eight different workstations, with one of the links for each workstation preferably being for voice communication (i.e., a telephone) and the other link preferably being for data communication (i.e., a computer).

The particular tap-off modules in the preferred embodiment preferably are serially connected between the adjacent ends of two main communication modules. The tap-off module preferably includes circuit boards which normally pass unused communication links therethrough to the downstream main communication modules for subsequent tap off and also tap off at least one particular grouping of links to the workstation area. The tap off function is accomplished either by direct connection to a particular grouping being tapped off or by selectively tapping off said grouping by switches or the like.

Other objects and purposes of the invention, and variations thereof, will be apparent upon reading the following specification and inspecting the accompanying drawings.

BRIEF DESCRIPTION OF THE DRAWINGS

FIG. 2 is a partial top view as viewed in the direction of arrows 2—2 of FIG. 4 illustrating the modular communication system of the invention mounted within a plurality of wall panels;

FIG. 3 is a partial top view illustrating an alternate arrangement for the modular communication system;

FIG. 6 is a side elevational view of a fixed tap-off connector;

FIG. 7 is a front view of the fixed tap-off connector;

FIG. 7A is a schematic diagram illustrating the wiring of the tap-off connector;

FIG. 8 is a perspective view of the tap-off connector;

FIG. 9 is a front view of a switchable tap-off connector;

FIG. 10 is a front view of the switchable tap-off connector;

FIG. 10A is a schematic diagram illustrating the wiring of the switchable tap-off connector wherein one grouping of communication links are tapped off;

FIG. 11 is a perspective view illustrating the switchable tap-off connector;

FIG. 12 is a front view illustrating the in-feed module;

FIG. 13 is a front view illustrating the in-feed module;

FIG. 13A is a schematic diagram illustrating the circuits of the in-feed module wherein groupings 1–6 are routed to a leftward downstream direction and groupings 7 and 8 are routed in a rightward downstream direction;

FIG. 14 is a perspective view illustrating the in-feed module;

FIG. 17 is a top view of a pass-through connector;

FIG. 18 is a side elevational view of the pass-through connector;

FIG. 19 is a front view of the pass-through connector;

FIG. 20 is a side view illustrating a pair of circuit boards for the tap-off connector;

FIG. 21 is a front view illustrating the circuit boards of FIG. 20;

FIG. 22 is a pictorial view of the circuit boards of FIGS. 20–21;

FIG. 23 is a side view illustrating a pair of circuit boards, an out-feed cable, and a communication jack for a fixed tap-off connector;

FIG. 23A is a schematic diagram illustrating the conductors connected to each communication port of the communication jack illustrated in FIG. 23;

FIG. 24 is a pictorial view of the circuit boards, out-feed cable and communication jack of the fixed tap-off connector;

FIG. 25 is a top view of a connector housing of a terminal block of the main communication module;

FIG. 26 is a front view illustrating the connector housing of the terminal block;

FIG. 27 is a side elevational view illustrating the housing of the terminal block;

FIG. 28 is a pictorial view illustrating the housing of the terminal block;

FIG. 29 is an exploded top view of the terminal block of the main communication module illustrating the terminal housing separated from a distribution cable and resilient contacts of the main communication module;

FIG. 30 is a perspective view of the terminal block illustrating the resilient contacts being inserted into the connector housing;

FIG. 44 is a pictorial exploded view of the circuit boards of the in-feed module illustrating a pin block and a plurality of connector pins for connection of one circuit board with the other circuit board and diagonal routing of the circuits from one edge of the boards to an opposite edge of the boards.

FIGS. 45A through 56 are diagrammatic plan views which illustrate the modular communication system of this invention, specifically variations and possible arrangements thereof, wherein:

FIGS. 45A 45B and 45C show three arrangements of the data distribution assembly (i.e., the modular communication system) employing in-line data taps (i.e., tap-off modules), with FIGS. 45A and 45B showing arrangements wherein a one-way data feed (i.e., an in-feed module) connects to either end of the system, and FIG. 45C showing the data feed being bi-directional and connected intermediate the length of the system;

FIGS. 49A and 49B relate solely to the data distribution segment, with FIG. 49A showing the segment structure and FIG. 49B showing the internal telecommunication links which pass therethrough;

FIGS. 50A and 50B relate to the in-line data tap, with FIG. 50A showing the structure of the data tap and FIG. 50B showing the telecommunication links or paths thereof;

FIGS. 53A and 53B relate to the one-way data feed, and specifically FIG. 53A illustrates the structure thereof and FIG. 53B illustrates the telecommunication links associated therewith;

FIGS. 54A and 54B illustrate a bi-direction data feed, and specifically FIG. 54A shows the structure thereof and FIG. 54B shows the telecommunication links associated therewith;

FIG. 55A shows the data tap connected to the data T, and FIG. 55B is a line diagram showing the telecommunication links and the coupling of the data tap to one of the links; and FIG. 56 is a diagrammatic plan view which illustrates several workstations disposed on opposite sides of a spline panel arrangement (the latter eliminated from the figure for purposes of clarity), with one arrangement of the communication system being disposed so as to extend generally along the spline panel arrangement for providing communication access to the adjacent workstation.

Figure 1:
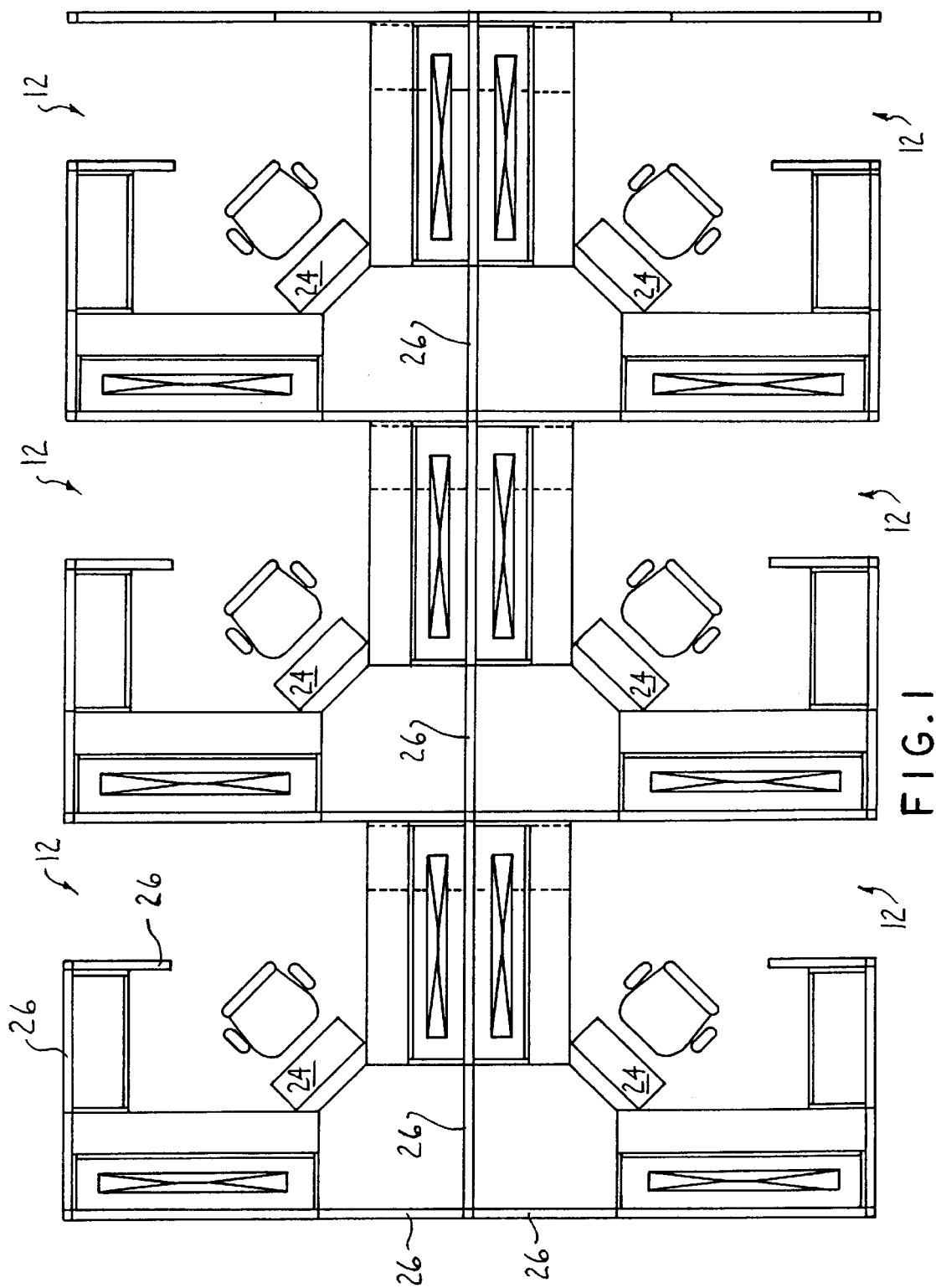
FIG. 1 is a top view illustrating a plurality of workstations and space-dividing wall panels.

Certain terminology will be used in the following description for convenience in reference only, and will not be limiting. For example, the words "upwardly", "downwardly", "rightwardly" and "leftwardly" will refer to directions in the drawings to which reference is made. The word "forward" will be used to designate the direction of the telecommunication link as it extends from the closet to the user equipment. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 5:
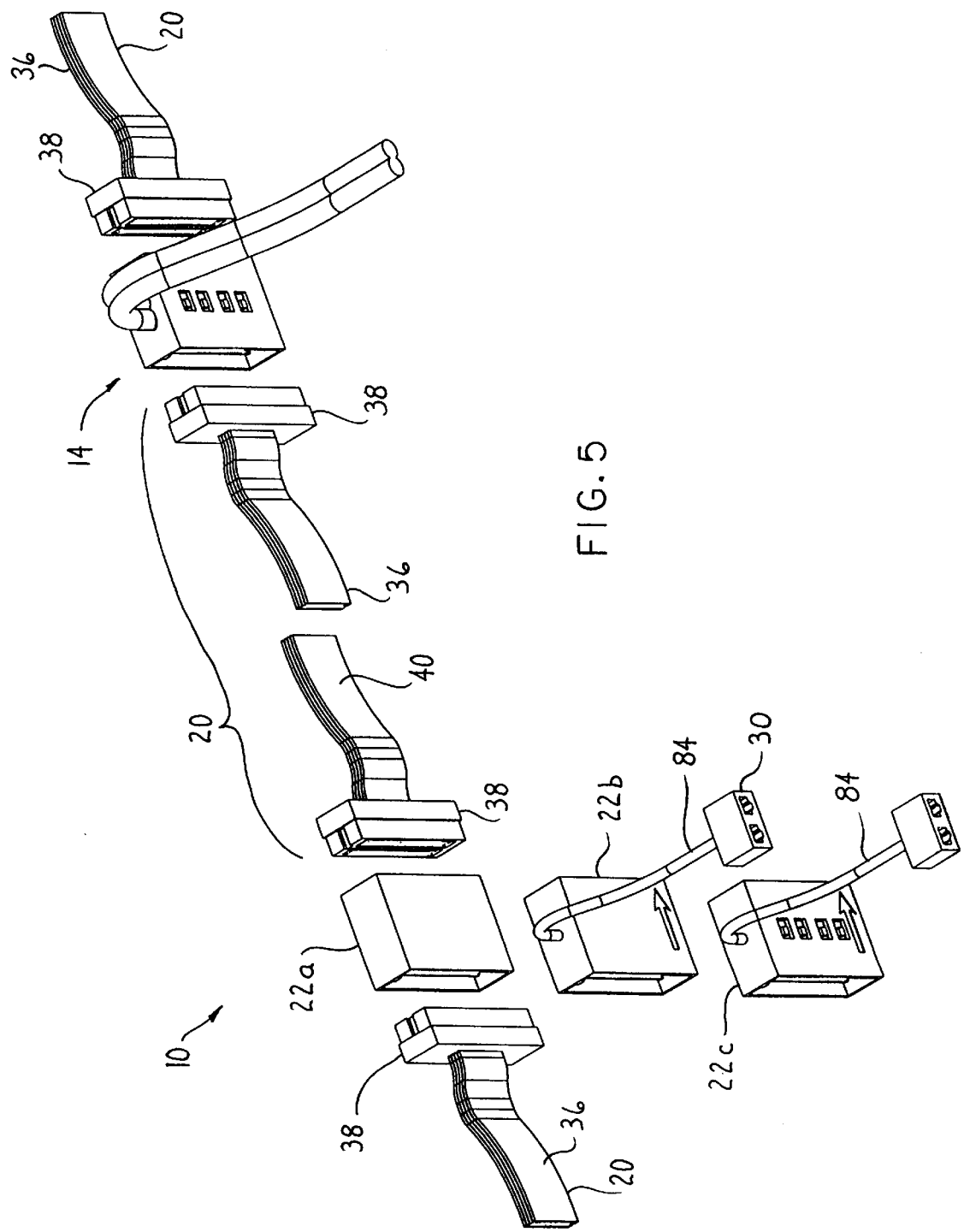
FIG. 5 is a perspective view of the modular communication system illustrating main communication modules, an in-feed module, a pass-through connector and two embodiments of a tap-off connector.

Referring to FIGS. 1, 2 and 5, the modular communication system of the invention is generally designated by reference numeral 10 and is used in an office furniture environment as illustrated in FIG. 1 to supply communication links, preferably voice and data links, to individual workstations 12. The modular communication system 10 includes an in-feed module 14 which connects through a main trunk cable 16 to a main communication or wiring closet 18, a selected number of main communication modules 20 which extend serially and are selectively connected by connectors 22 which may be of the pass-through type 22a or the tap-off type 22b and 22c for the connection of communications equipment 24 of each workstation 12 to the modular communication system 10.

The typical "systems" furniture in which the modular communication system 10 is used define a plurality of workstations 12 which are partitioned one from the other by a plurality of space-dividing wall panels 26 as generally illustrated in FIG. 1. The use of wall panels 26 in partitioning a floor space to define a plurality of workstations 12 is well known.

In addition, each workstation 12 typically includes communications equipment 24, such as computers, telephones or the like, which require voice and/or data links, i.e. paths, between the workstations 12 and a typical communications or wiring closet 24 which houses communications equipment, cable terminations and cross-connect cabling for the building. By completing such links, each workstation 12 is connected to the telecommunications and computer networks of the building although conventional methods of completing such connections suffer from the disadvantages previously discussed herein. The modular communication system 10 of the invention facilitates selective connection of each individual workstation and more particularly, each communication link, i.e. voice and data link, of each workstation 12 to the wiring closet 18 and thereby, to the building's communications networks.

Figure 4:
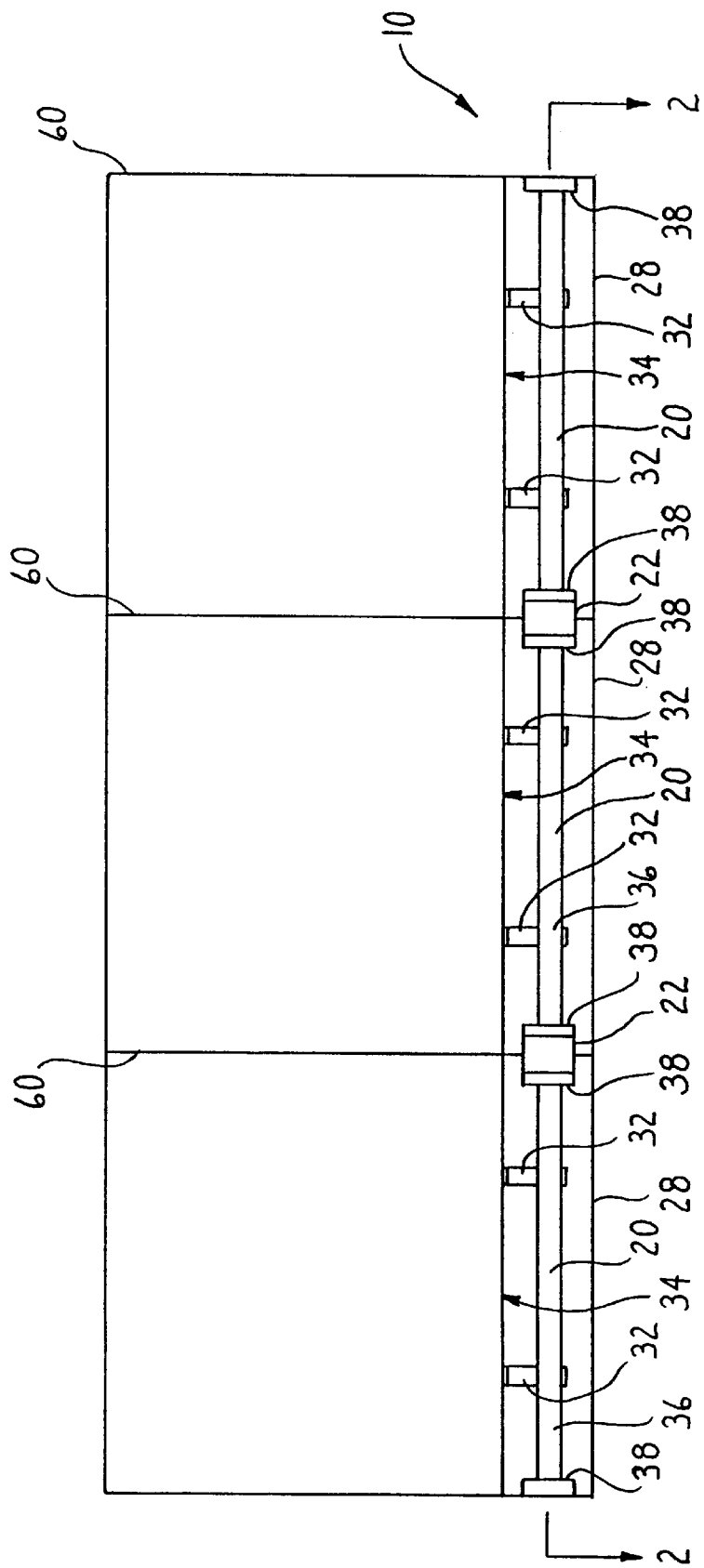
FIG. 4 is a front sectional view as viewed in the direction of arrows 4—4 in FIG. 2 illustrating the modular communication system mounted within raceways of the wall panels.

Referring to FIGS. 2 and 4, the modular communication system 10 includes elongate main communication modules 20 which preferably mount within raceways 28 of each wall panel 26 and extend horizontally longitudinally along the panel length, and connectors 22 which may be pass-through connectors 22a for serially connecting two or more main communication modules 20 together or out-feed connectors 22b and 22c which provide communication jacks or outlets 30 for access by each workstation 12. In this manner, computers or telecommunications equipment 24 may be selectively connected to the communications networks. While the modular communication system 10 is illustrated in the raceways 28 of the wall panels 26, it should be appreciated that the system 10 can be disposed in any suitable cabling space.

More particularly, each wall panel 26 is formed of a predetermined length and has the hollow raceway 28 formed therein. The raceway 28 extends along the length of the panel 26 typically at the bottom thereof although if necessary, the raceway 28 may be disposed towards the top of the panel 26 or at any intermediate height. To support the modular communication system 10 within the raceway 28, each wall panel 26 preferably has support brackets 32 which have a U-shape or any other suitable configuration and mount to an interior surface 34 of the raceway 28.

Referring to FIGS. 2, 4 and 5, each main communication module 20 includes an elongate distribution cable 36 having terminal blocks 38 connected at opposite ends thereof for connection to a selected one of the connectors 22a–c or to an in-feed module 14. The distribution cable 36 comprises a plurality of conductors or wires (not illustrated) which preferably define particular groupings or pairs of voice and data links for each workstation 12. More specifically, the distribution cable 36 preferably includes one hundred twenty-eight (128) conductors to serve eight (8) workstations wherein each grouping of conductors for each workstation 12 comprises four (4) pairs of conductors for each voice or data link, i.e. eight conductors for each link and sixteen conductors for each grouping to serve one workstation, and one hundred twenty-eight total conductors to serve eight workstations. It should be appreciated that while one hundred twenty-eight conductors is the preferred amount of conductors for serving eight workstations, this quantity may be varied depending upon the number of workstations being served, the number of links being provided to each workstation, and the number of conductors being connected to each link. As one skilled in the art would appreciate, all four pairs of conductors of each link which pairs define a single path in the link need not be utilized or even provided to each workstation 12.

In the preferred embodiment generally illustrated in FIG. 5 and more particularly illustrated in FIG. 29, the distribution cable 36 is formed of four layers of substantially flat ribbon cable 40 which cable should be sufficiently flexible to permit flexing of the distribution cable 36 proximate the terminal blocks 38 as generally illustrated in FIG. 2 to facilitate connection. Referring to FIGS. 5 and 29, each ribbon cable 40 preferably includes thirty two (32) of the one hundred twenty-eight (128) conductors being provided in the aforesaid eight grouping system of the preferred embodiment. To provide optimum performance of the conductors, the conductors are arranged side by side and the ribbon cables 40 preferably are shielded one from the other and also shielded from a power supply system (not illustrated) which may be disposed within the raceways 28.

Figure 32:
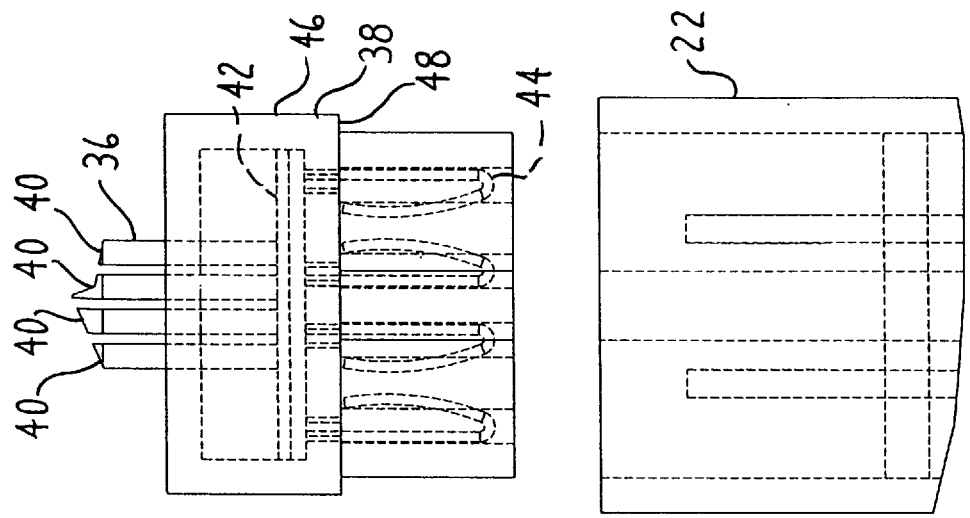
FIG. 32 is an enlarged view of FIG. 31 illustrating the connector block and connector as well as the distribution cable, resilient contacts and the circuit boards of the connector prior to connection with the terminal block.
Figure 31:
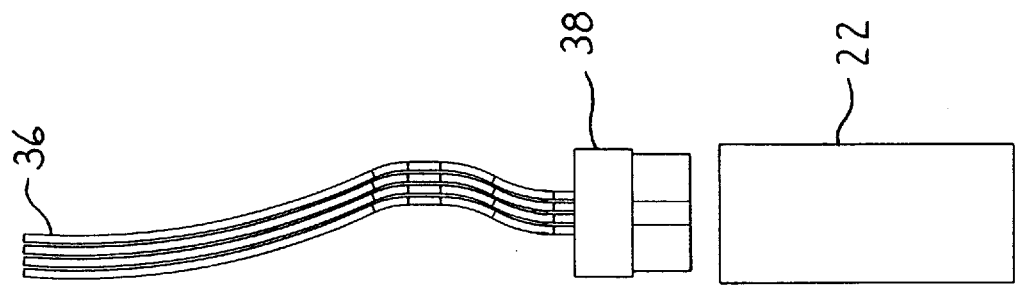
FIG. 31 is an exploded view illustrating the terminal block prior to insertion with one of the connectors.

Referring to FIGS. 29 and 32, each terminal block 38 includes a rectangular bottom contact plate 42 to which the distribution cable 36 is secured and a plurality of resilient contacts 44 mounted to the contact plate 42 on the side thereof opposite the distribution cable 36. As illustrated in FIG. 29, the resilient contacts 44 are arranged in pairs defining opposing spaced apart rows, two pairs of which are provided. Each resilient contact 44 is in electrical communication with a corresponding one of the conductors of the distribution cable 36. As illustrated in FIG. 30, the resilient contacts 44 also are evenly spaced apart one from the other along a longitudinal length of the contact plate to prevent electrical communication between each adjacent resilient contact 44. In the illustrated preferred embodiment, one hundred twenty-eight (128) contacts are provided for connection with the one hundred twenty-eight (128) conductors of the distribution cable 36.

Referring to FIGS. 25–28, each terminal block 38 includes a substantially rectangular terminal housing 46 having a shoulder formed about the external periphery of the terminal housing 46 and facing away from the distribution cable 36 for abutment against one of the connectors 22 or the in-feed module 14 as will be discussed herein in more detail. While a key 49 is illustrated to ensure alignment, the key 49 is not required.

Each terminal housing 46 is formed with a pair of forwardly opening sockets 50, a rearward cavity 52 and an intermediate wall 54 disposed therebetween for separating the cavity 52 and the sockets 50 one from the other. To insert the resilient contacts 44 through the cavity 52 and the interior wall 54 and then into the sockets 50, a plurality of apertures 56 are formed through the intermediate wall 54 as illustrated in FIG. 32. Preferably the apertures 56 are dimensioned so that the resilient contacts 44 are biased inwardly when being inserted therethrough which contacts 44 then return to their original configuration to prevent removal of these contacts 44 through the apertures 56.

To maintain the resilient contacts 44 separate one from the other, each socket 50 includes inwardly projecting spacer walls 58 disposed adjacent to each of the apertures 56 as illustrated in FIGS. 26 and 28. The terminal block 38 thereby is formed by aligning the resilient contacts 44 with the apertures 56 as generally illustrated in FIGS. 29 and 30 and then inserting the contact plate 42 and attached resilient contacts 44 into the cavity 52 such that the contacts 44 are received through the apertures 56 and disposed within the sockets 50 as illustrated in FIG. 32.

Referring to FIG. 4, when the main communication modules 20 are disposed within the raceways 28, the terminal blocks 38 preferably are positioned proximate the ends 60 of the wall panels 26 to facilitate connection of connectors 22 thereto. Referring to FIG. 3, distribution cable 36 connected to the terminal blocks 38 is sufficiently flexible so as to permit the terminal blocks 38 to be manipulated into position longitudinally along the wall panel 26 and permit connection of said connectors 22 thereto.

Referring to FIG. 5, where there is no workstation 12 proximate the juncture between two serially adjacent main communication modules 20, a pass-through connector 22a is connected between adjacent terminal blocks 38 which thereby maintains continuity between the conductors of one main communication module 20 and the corresponding conductors of the adjacent main communication module 20. As a result, all eight groupings of voice and data links in the preferred embodiment are continued downstream through the connector 22a.

Figure 33:
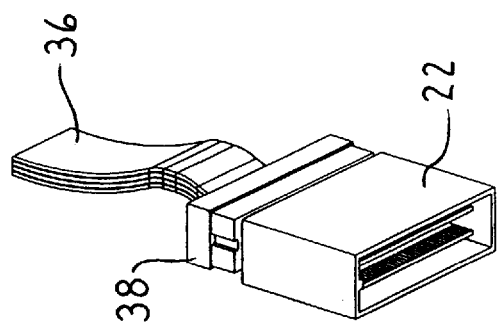
FIG. 33 is a perspective view illustrating the terminal block and connector prior to connection one with other.
Figure 35:
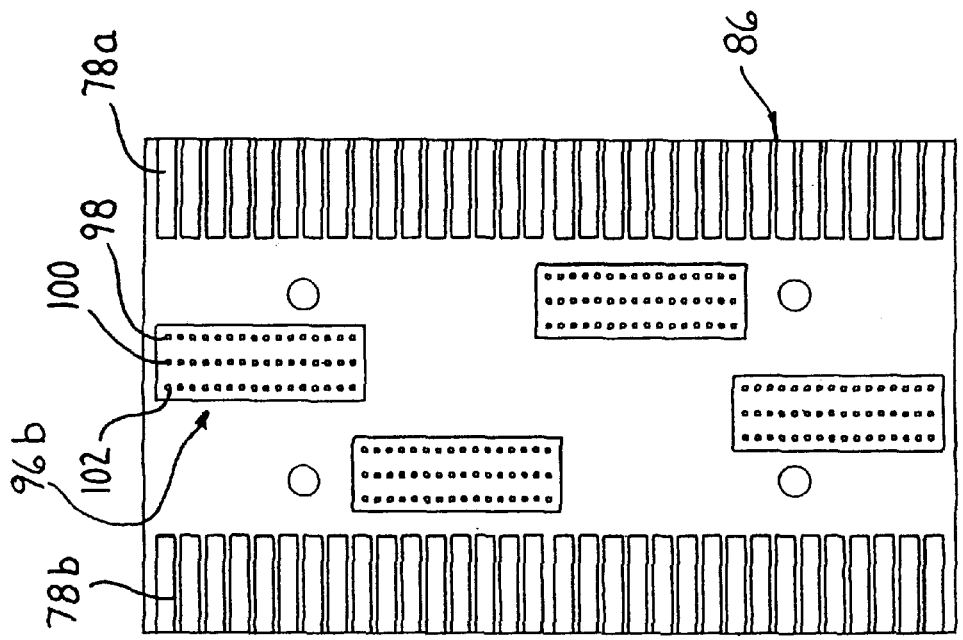
FIG. 35 is a front view of one of the circuit boards with the plurality of switches mounted thereon.

Referring to FIGS. 17–19, the pass-through connector 22a includes a rectangular, hollow connector housing 22a which defines openings at both ends thereof and has a peripheral interior surface 64 adapted to receive therein the corresponding terminal housing 46 of the terminal block 38 being connected thereto as generally illustrated in FIGS. 32 and 33.

To connect the resilient contacts 44 of one main communication module 20 with the corresponding resilient contacts 44 of an adjacent main communication module 20, two spaced apart, substantially parallel printed circuit boards 66, as generally illustrated in FIG. 22, are mounted within the interior of the connector housing 22a as illustrated in FIG. 18. The circuit boards 66 are secured in position within the interior by four support rods 70 which extend through each circuit board 66 and are fixedly secured at their ends to respective side walls of the connector housing 62 as illustrated in FIGS. 17–19. To maintain the circuit board 66 in the spaced apart, parallel alignment illustrated in FIG. 18, spacer sleeves 72 or the like having an increased diameter relative to the support rod 70 may be provided as seen in phantom outline in FIG. 18.

Referring to FIG. 19, each circuit board 66 is defined by two opposite edges 74a and 74b and opposite faces 76a–76d and include a plurality of contacts 78a and 78b formed thereon along respective edges 74a and 74b. The quantity of contacts 78 correspond to the quantity of conductors, i.e. resilient contacts 44 of the terminal block 38 adjacent thereto. In the preferred embodiment illustrated, each edge 74 of the circuit board 66 has thirty-two (32) contacts 78 on each face 76 for a total quantity of one hundred twenty-eight (128) contacts 78.

To provide electrical contact between one edge 74a of the circuit board 66 and the laterally adjacent opposite edge 74b thereof, each pair of laterally adjacent contacts 78a and 78b are electrically connected one with the other by electrically conductive traces 80 formed on the surface of the circuit board 66 as illustrated in FIG. 21. As a result, a plurality of parallel, separate circuit paths are formed on each face 76 between each laterally adjacent pair of contacts 78a and 78b through the particular trace 80 connected therebetween a representative one of which is illustrated in FIG. 19

Each circuit board 66 is formed with a predetermined thickness such that when the pass-through connector 22a is connected to an adjacent terminal block 38, each circuit board 66 is disposed between and biased by the resilient contacts 44 of the terminal block 38 as illustrated in FIG. 32 just prior to connection. Accordingly, each resilient contact 44 will only press against and contact one of the contacts 78 of the pass-through connector 22a which is mutually adjacent thereto.

With such an arrangement, sixteen (16) conductors which define each grouping of voice and data links continue through the pass-through connector 22a directly from one side to the other without altering the relative positions of groupings in the terminal block 38. For example, as illustrated in FIG. 19 the sixteen (16) upper right contacts 78a would define a first grouping for the voice and data signals designated generally by reference numeral 1 and associated with the first workstation which signals would pass directly through the traces 80 across to the contacts 78b on the opposite side thereof. In other words, the thirty-two (32) contacts 78a on each face 76a–d of the circuit board 66 define two groupings of voice and data links for two workstations 12, i.e. sixteen contacts 78 for each grouping. As FIG. 20 illustrates, the four faces 76a–d of two circuit boards define groupings 1–8 which correspond to the desired eight (8) workstations 12 wherein the relative orientation of these groupings on the circuit board are maintained through the main communication modules 20, through the pass-through connector 22a, and through subsequent main communication modules 20.

To tap-off to a workstation 12 with a communications outlet or jack 30 as generally illustrated in FIG. 2, the out-feed or tap-off connector illustrated in FIGS. 2 and 5 is provided. One embodiment of an out-feed or tap-off type of connector 22 is a dedicated or fixed tap-off connector 22b which is wired so that one or more of the groupings passes through an out feed cable 84 and terminates at the communication jack 30 thereof. In the dedicated tap-off connector 22b, the signals for the voice and data links of the particular grouping being tapped off pass-through the main communication module 20, into the dedicated out-feed connector 22b and are tapped off to the out-feed cable 84. In addition, the circuit of the tapped-off grouping is broken beyond said connector 22b such that the conductors corresponding to the particular grouping are dead downstream along the remainder of the modular communication system 10. Since these groupings are dead downstream, inadvertent or intentional tapping off of the grouping downstream of the first tap off site is prevented.

Referring to FIGS. 6–8, the dedicated connector 22b is constructed similar to the pass-through connector 22a in that the dedicated connector 22b includes a rectangular, hollow connector housing 62 which is open at both ends for connection to respective terminal blocks 38 of adjacent main communication modules 20 as illustrated in FIG. 2. In addition, the dedicated out-feed connector 22b includes a pair of circuit boards 86 which are constructed similar to the circuit board 66 of the pass-through connector 22a and function to access the plurality of links which extend along the system. The difference is that at least one grouping or pair of communication links indicated by reference numerals 88a and 88b in FIG. 7A preferably is hard wired to the out-feed cable 84 so that the grouping is dead downstream therefrom and instead is tapped off to the communication jack 30. In FIG. 7A, a schematic diagram illustrates the grouping of the voice link 88a and the data link 88b which communication links each comprise four pairs of conductors, i.e. sixteen (16) conductors total, and are wired so as to provide a tap-off for the seventh workstation of the network while the remaining groupings 1–6 and 8 pass through the dedicated out-feed connector 22b. As described herein, if one of the groupings 1–6 or 8 has already been tapped off, a particular grouping at this point in the modular communication system 10 will be dead while the remaining groupings would be active so as to continue the signals passing therethrough.

Figure 34:
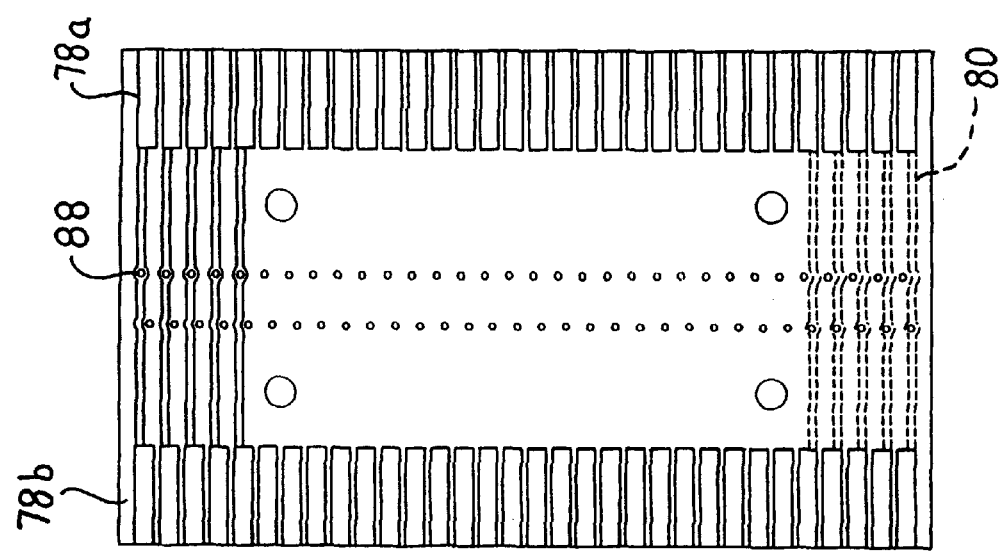
FIG. 34 is a front view of a circuit board of FIGS. 20–22 illustrating traces and solid lines on one face of the circuit board and the traces illustrated in phantom outline which are disposed on the opposite side of the circuit board.

The particular hard wiring of the dedicated connector 22b is illustrated in FIGS. 23, 23A and 24. As illustrated generally in FIG. 23, the grouping of sixteen (16) conductors would be tapped off by hard wiring the individual conductors onto the circuit board 86. The circuit board 86 is illustrated in FIG. 21 as having bores 88 which pass-through the substrate of the circuit board to each individual trace 80. The bores are provided so that each appropriate wire of the out-feed cable 84 may be inserted and soldered therein as illustrated in FIG. 23 to make an electrical connection with the appropriate trace 80. As illustrated in FIG. 34, the traces 80 and bores 88 on the opposite faces 76 of the circuit board 86 are offset so that one column of bores 88 permits contact with the traces 80 on one face 76 and the other column of bores 88 permits contact with the traces 80 on the opposite face 76 of the circuit board 86. To break the downstream circuit, the traces may simply be broken so that the signal only passes through the out-feed cable 84 to the communication jack 30 wherein referring to FIG. 23A eight (8) conductors are wired to one communication port 90a, for example, for a voice link and the other eight (8) conductors are wired to an adjacent communication port 90b, for example, for a data link. By varying the location of the connections of the sixteen (16) conductors to the traces 80 corresponding to different groupings of conductors on the two circuit boards 86, any one of the eight groupings for the eight different workstations 12 may be accessed and tapped off. If the out-feed cable 84 accommodates additional conductors or additional out-feed cables 84 are mounted to the connector housing 22a thereof, additional groupings of data and voice links may also be tapped off from one single dedicated out-feed connector 22b to serve an additional workstation 12.

With such an arrangement, a set of predetermined dedicated out-feed connectors 22b is provided to connect any one of the eight groupings of data and voice links which grouping being tapped off is determined by the installer and may be changed by replacing one connector 22b with a differently wired connector 22b. Preferably, only four variations of the dedicated out-feed connectors 22b are provided since if grouping 2 of FIG. 23 is prewired, the dedicated out-feed connector 22b may be rotated about its horizontal axis so that the same dedicated connector 22b now taps off grouping 7 of the data and voice links. The boards 86 may also be changed to tap off only one link or a smaller number of conductors.

As illustrated in FIG. 8, a directional marking may be provided on the connector housing 62 to ensure proper orientation of the connector 22b. The directional marking 92 illustrated is an arrow which points towards the in-feed module 14 to ensure proper orientation thereof. Any other system of marking also may be used.

To provide the additional capability of selectively choosing which grouping of voice and data links which will be tapped off by one particular out-feed connector 22, the out-feed connector 22 may be formed as a switchable out-feed connector 22c as illustrated in FIGS. 5 and 9–11. The switchable out-feed connector 22c includes an appropriate number of switches 96, preferably eight, each of which controls one particular grouping of voice and data links and is thereby switchable between a pass-through position and a tap-off position. When one particular grouping is tapped off by actuation of a selected switch 96, the downstream conductors corresponding thereto are terminated, i.e. dead.

Similar to the pass-through connectors 22a and the dedicated out-feed connectors 22b, the switchable out-feed connector includes a connector housing 62 and has a pair of printed circuit boards 86 disposed therein and spaced apart in substantially parallel alignment. The switchable out-feed connector 22c also includes an out-feed cable 84 and communication jack 30 like the connector 22b discussed previously herein such that the switchable out-feed connector 22c connects between serially adjacent terminal blocks 38 of adjacent main communication modules 20.

Eight switches are provided, preferably four on each side wherein each switch 96 is movable to a tap-off position. As indicated by the schematic diagram of FIG. 10A, switching the eighth switch 96 serves to tap-off the eight grouping, i.e. grouping 8, of voice and data links for the eighth workstation whereby the eighth grouping of conductors is dead on the downstream side of the switchable out-feed connector 22c. Thus, as the configuration of the communication or furniture system changes, each switchable out-feed connector 22c may be selectively set to tap-off any particular one of the groupings of voice and data links.

Figure 15:
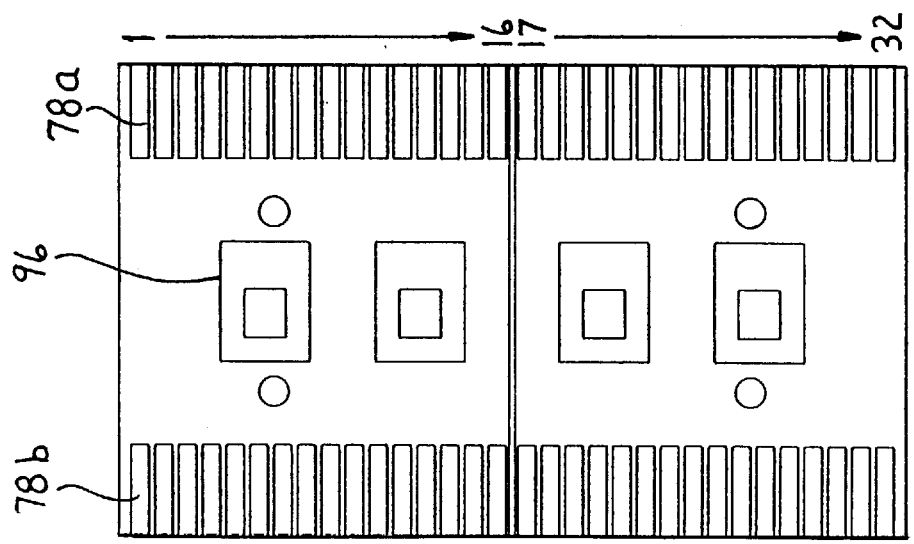
FIG. 15 is a front view illustrating a circuit board and attached switches for the switchable tap-off connector.
Figure 16:
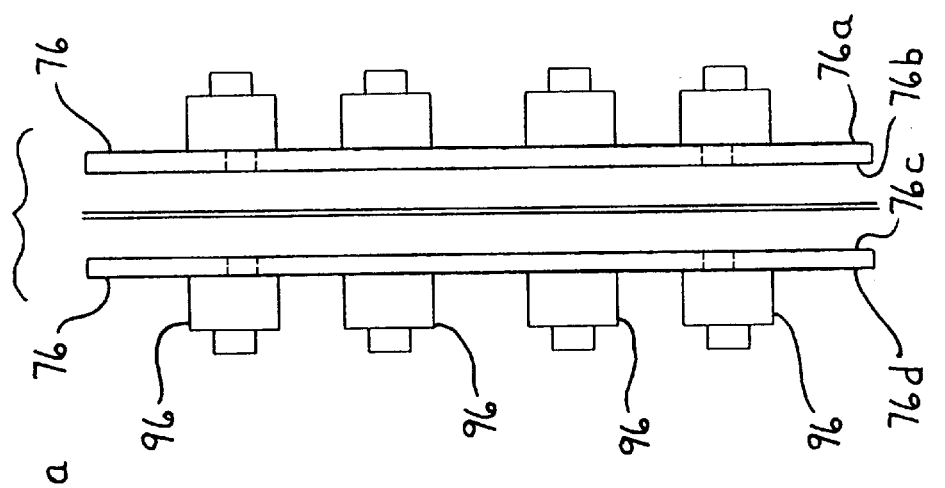
FIG. 16 is a side elevational view illustrating a pair of the circuit boards and attached switches of the switchable tap-off connector.
Figure 16A:
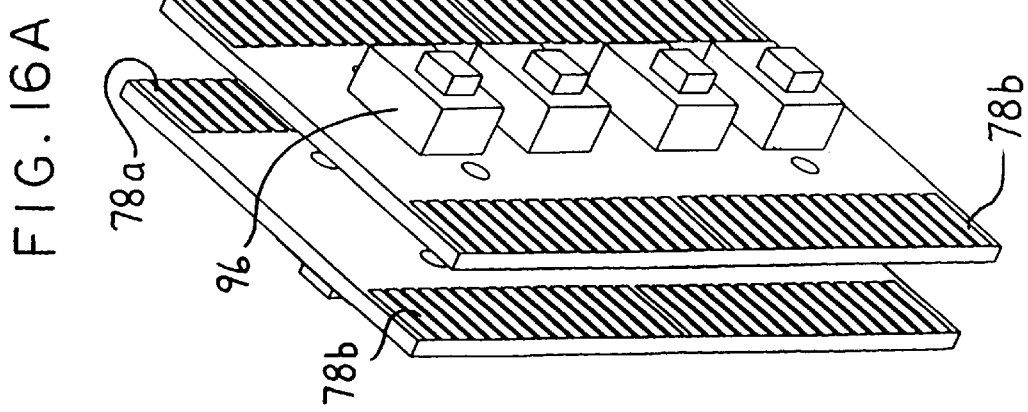
FIG. 16A is a pictorial view of the circuit boards and switches of FIG. 16.

More particularly as seen in FIGS. 15, 16 and 16A, few of the switches 96 may be mounted on the one face 76d of one circuit board 86 while the other four switches 96 are mounted on the face 76b of the adjacent circuit board 86 opposite thereto which facilitates access through the side walls of the connector housing 94. As illustrated, switch 96 may be a two position switch which is wired on the circuit board 86 so as to selectively determine the path through which the voice and data link signals will pass. In this embodiment, the circuit boards 86 are illustrated in FIG. 21 and have the bores 88 therethrough to access the traces 80 extending between the appropriate contacts 78. In other words, one grouping typically will be tapped off while the conductors downstream are dead and the other seven groupings are passed through although all eight groupings may be passed through if desired.

Figure 36:
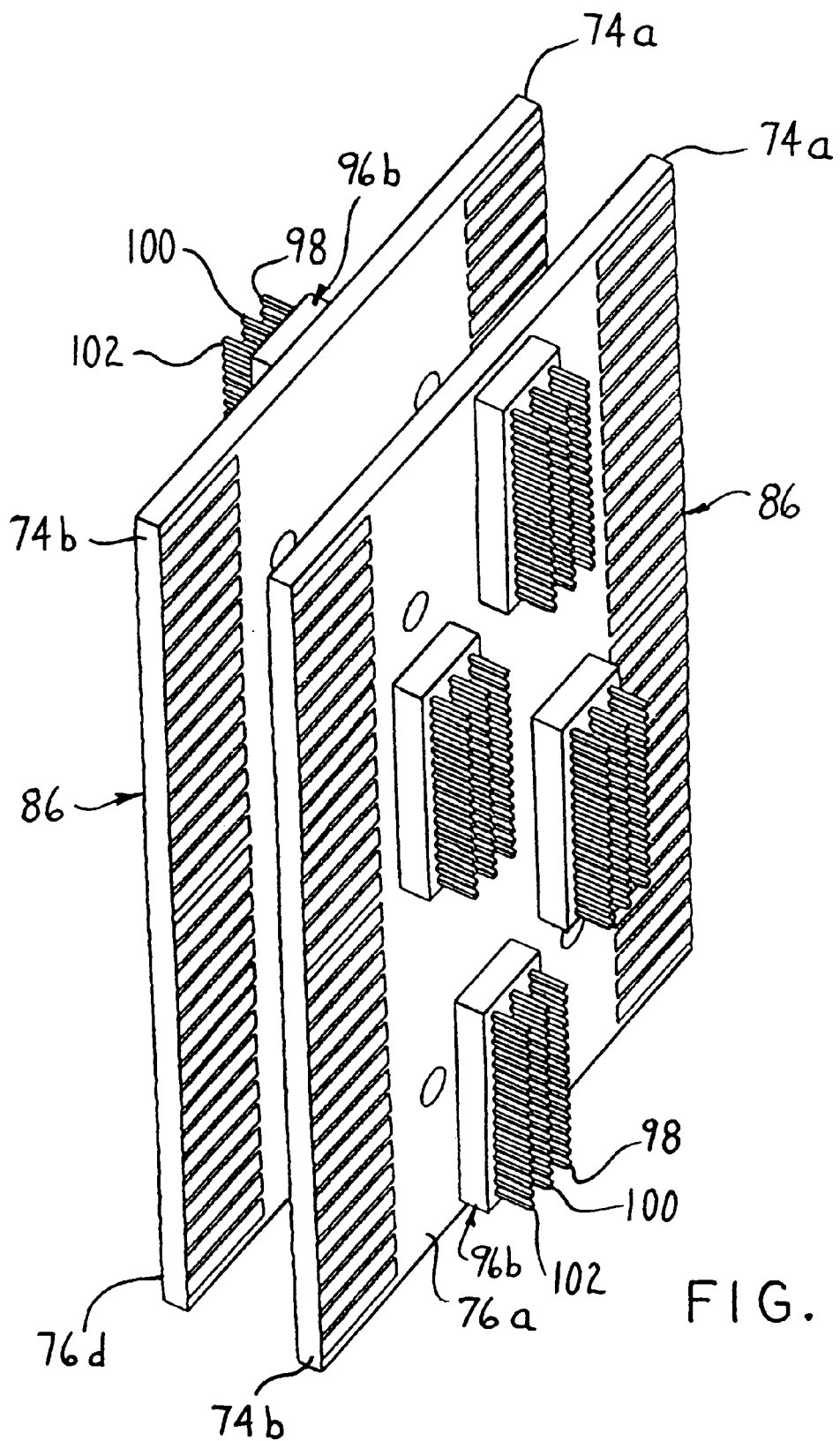
FIG. 36 is a pictorial view of the circuit boards and switches illustrated in FIG. 35.
Figure 42:
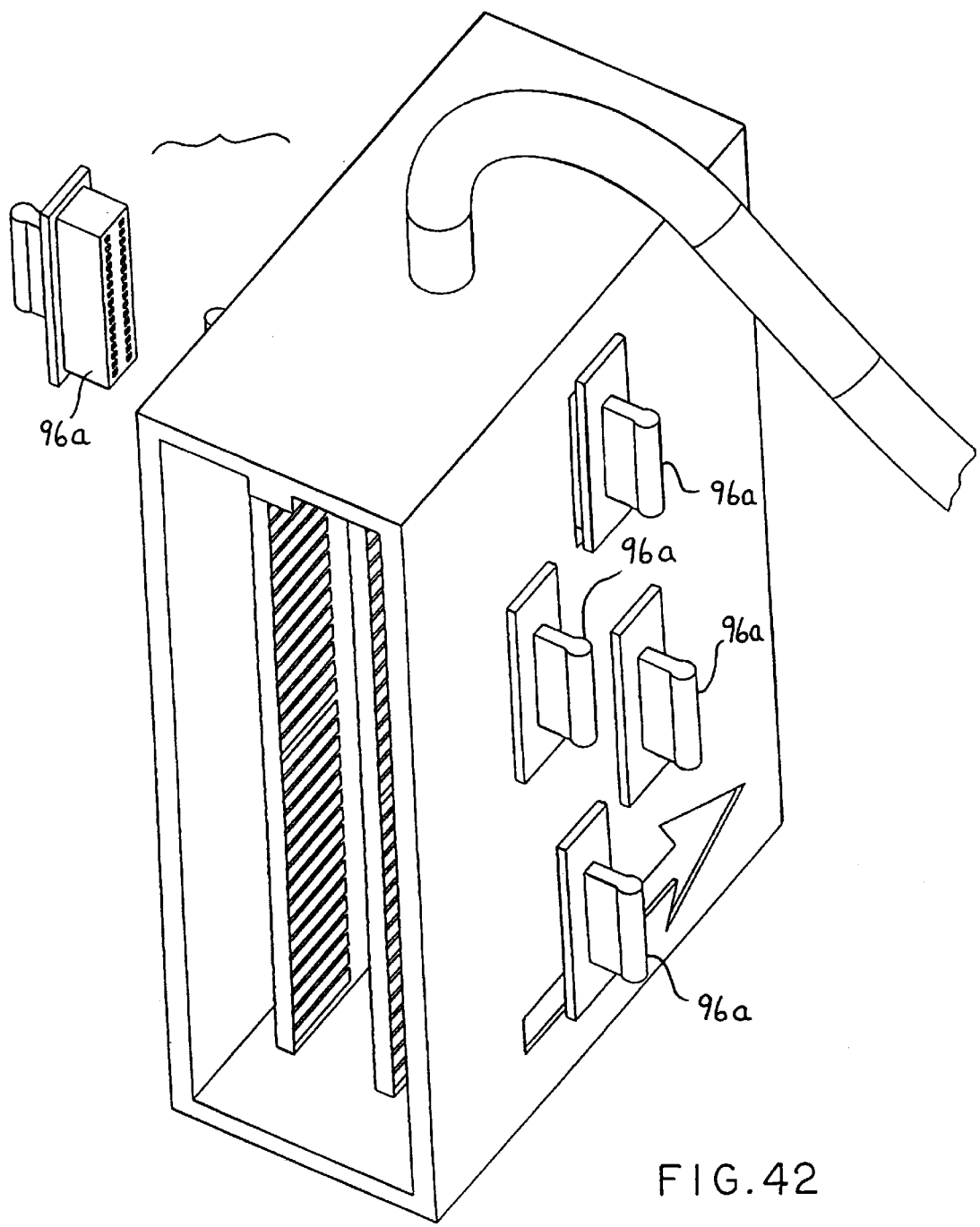
FIG. 42 is a pictorial view of the switchable tap-off connector illustrating one switch disengaged from a switch socket thereof.
Figure 43:
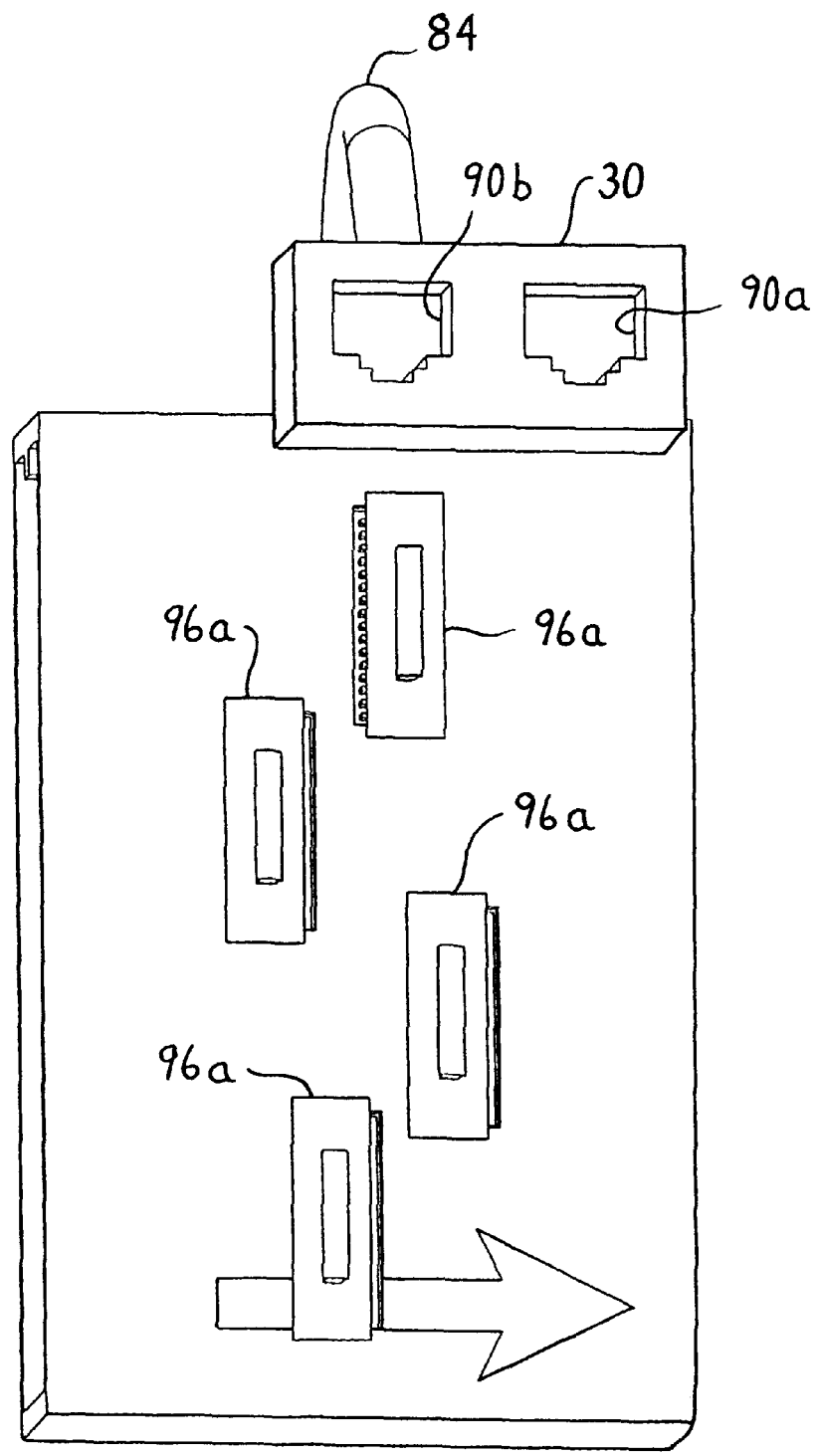
FIG. 43 is an enlarged front view of the switchable tap-off connector illustrating one switch in a tap-off position and three other switches each in a pass through position.

In the preferred switch arrangement illustrated in FIGS. 42–43, the switches 96a are provided in a staggered arrangement wherein the switch 96a is used in combination with a switch part 96b (FIG. 36) having three rows of contact pins 98, 100 and 102 which rows are substantially parallel one with the other and each comprise sixteen (16) contact pins. Referring to FIG. 36, the rows of contact pins 98, 100 and 102 project outwardly from switch blocks 96b mounted on respective faces 76a and 76d of the circuit board 86. In wiring the circuit boards 86, each of the sixteen (16) pins in the rows of contact pins 98, 100 and 102 are electrically connected to sixteen respective contacts 78 of the respective groupings 1–8 so that each switch controls the routing of the voice and data link signals through the out-feed connector 22c. More specifically, the center row of contact pins 100 are electrically connected to the sixteen (16) contacts 78a disposed closest to the in-feed module 14 while the rows of contact pins 102 and 98 which are offset laterally to the sides of the contact pins 100 are connected respectively either to the contacts 78b on the opposite side of the circuit board 86 or to the conductors of the out-feed cable 84. Thus when the center row of contact pins 100 is electrically connected with the contact pins 102 which, for example, are connected to the other set of contacts 78b on the opposite edge 74b of the circuit board 86, an electrical circuit is completed such that electrical signals pass-through the out-feed connector 22c and continue downstream through a serially adjacent main communication module 20. Conversely the row of contact pins 100 may be electrically connected with the other row of contact pins 98 such that the circuit is completed through the out-feed cable to the communications module 30 and thereby each switch 96a in effect is switchable between a pass-through position and a tap-off position.

Figure 37:
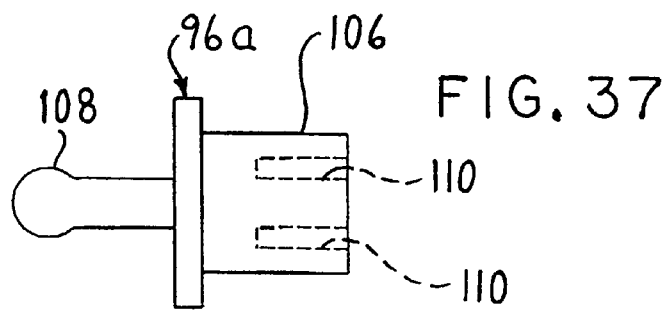
FIG. 37 is a top view of a preferred embodiment for the switch.
Figure 38:
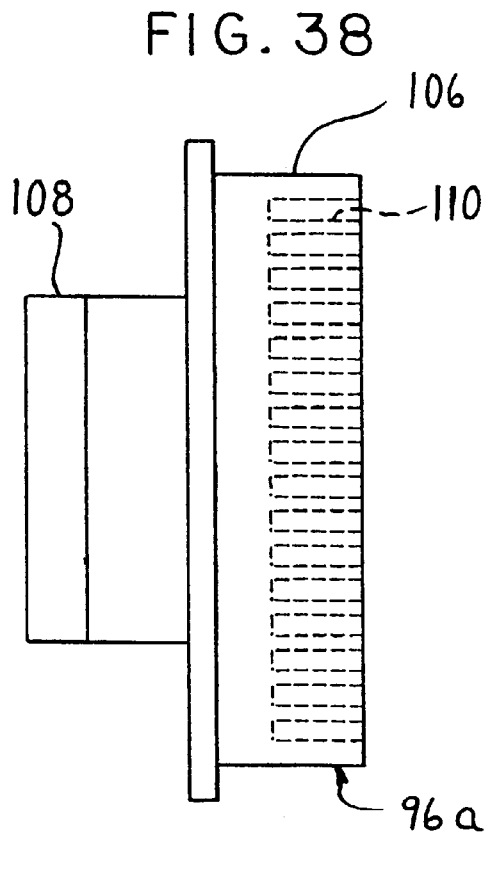
FIG. 38 is a side view of the switch illustrated in FIG. 37.
Figure 39:
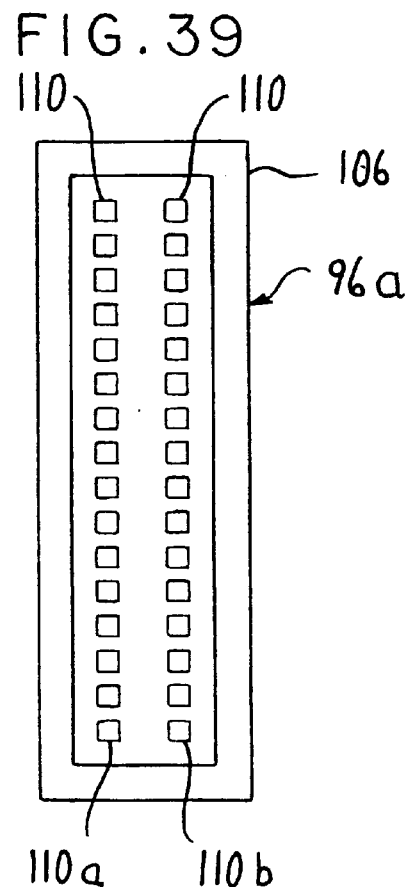
FIG. 39 is a front view of the switch illustrating two parallel rows of pin receiving bores.
Figure 40A:
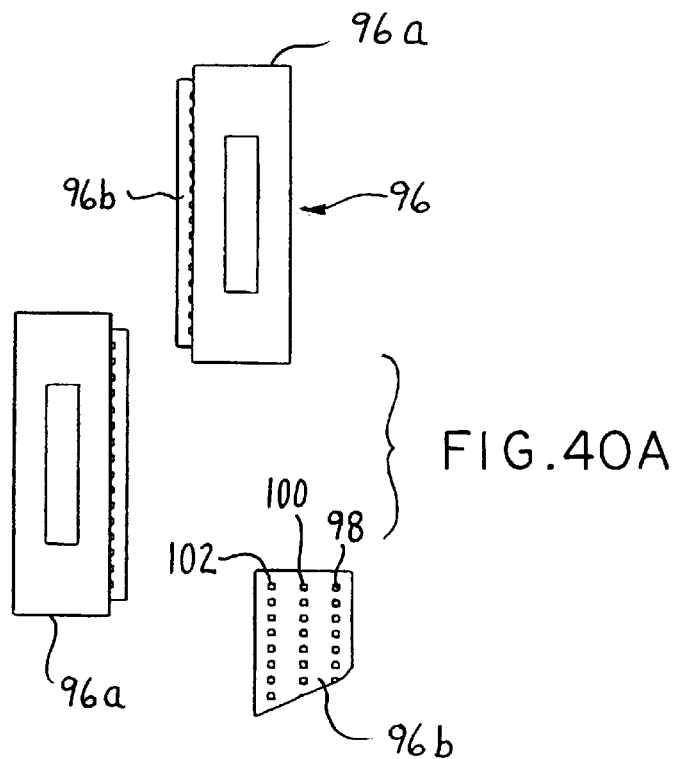
FIG. 40A is a detailed view of the switches illustrated in FIG. 40.
Figure 40:
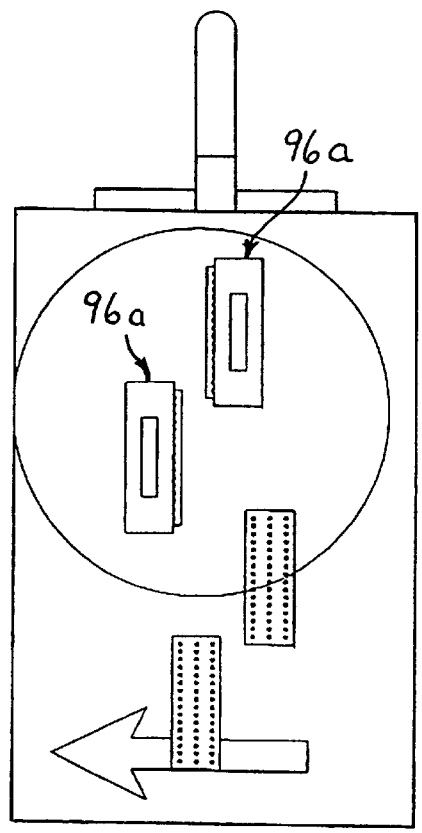
FIG. 40 is a front view of one embodiment of the switchable tap-off connector illustrating one switch in a tap-off position and a second switch disposed below the first switch and illustrated in a pass through position.
Figure 41:
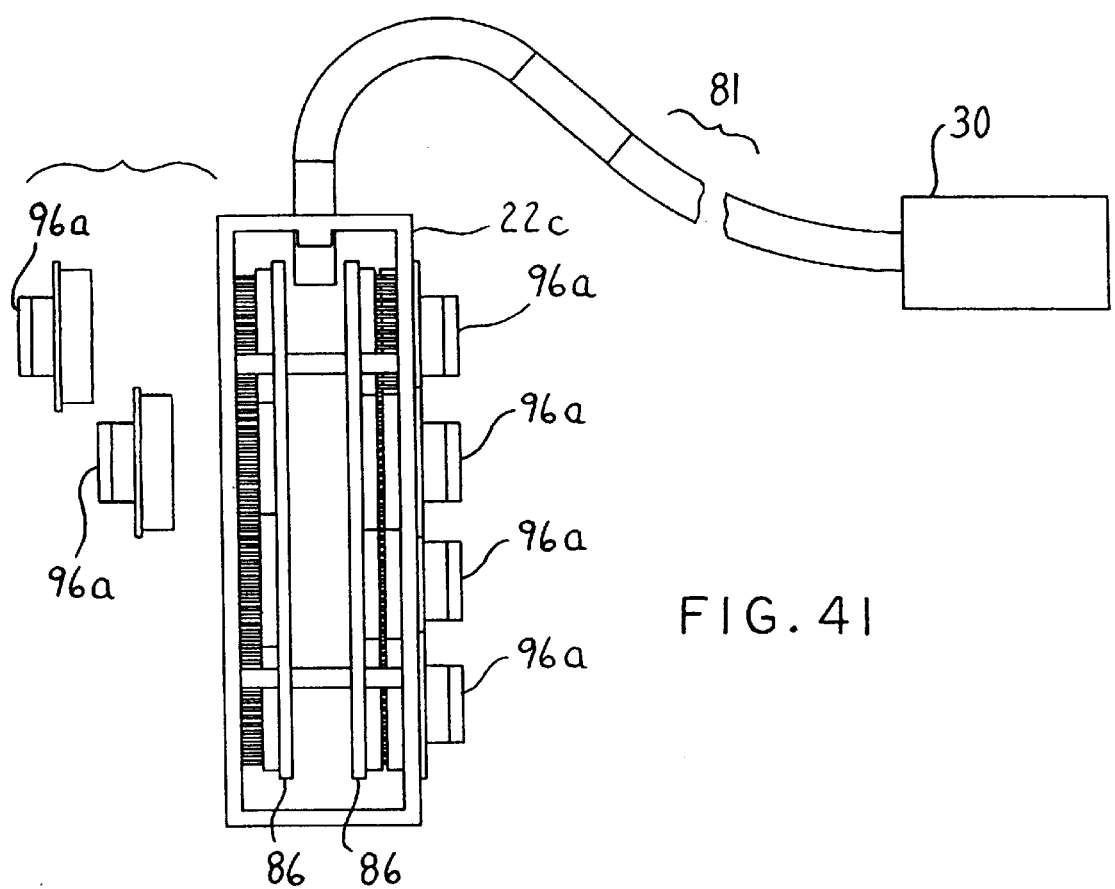
FIG. 41 is a side view of the switchable tap-off connector of FIG. 40.

Referring to FIGS. 37–39, the switching function is accomplished by the switch 96a illustrated in these figures which essentially comprises a rectangular block portion 106 and a handle portion 108. The block portion 106 includes two parallel rows of sixteen (16) pin sockets 110 wherein each pair of adjacent pin sockets 110 are electrically connected to jump adjacent pairs of pins. Thus the switch 96a may be selectively positioned in either one of two positions wherein the switch 96a may be seated on the row of contact pins 98 as well as the center row of contact pins 100 which thereby defines a tap-off position when the switch 96a is seated thereon. The switch 96a also defines a pass-through position when the switch 96a is seated on the center row of contact pins 100 and the adjacent row of contact pins 102 as illustrated in FIGS. 40 and 40A. As illustrated in FIG. 43, the switches 96a are selectively set such that the uppermost switch 96a is set in a tap-off position while the three lowermost switches 96a as well as the four switches 96a on the hidden side of the switchable out-feed connector 22b are in the pass-through position. The relative positions of the switches 96a may simply be reset by removing switches 96a and placing same in an appropriate position in order to reconfigure the modular communication system 10.

With the modular communication system 10 as described herein, each of the workstations 12 may be provided with a selected grouping for the data and voice links which is accomplished by serially connecting the main communication modules 20, connecting a pass-through connector 22a where no tap-offs are required and where a tap-off is required, connecting one of the out-feed tap-off connectors 22b or 22c to position the communications jacks 30 in the appropriate workstation area 12.

Referring to FIGS. 5, 12, 13, 13A and 14, the modular communication system 10 includes an in-feed module 14 having a in-feed cable 112 terminating at a punch down block which connects to the main trunk cable 16 and completes the connection of the modular communication 10 to the wiring closet 18. In the illustrated preferred embodiment, the in-feed module 14 supplies the eight groupings of data and voice links to the modular communication system 10 and may be either connected to the modular communication system 10 in the middle of the system as illustrated in FIG. 5 or may be connected at a distal end of the modular communication system 10 by simple connection to the first terminal blocks 38 thereat.

As illustrated in FIG. 5, the main in-feed module 14 may simply be connected between opposing terminal blocks 38 of mutually adjacent main communication modules 20. To selectively direct the eight groupings of voice and data links either to one downstream side of the in-feed module 14 or the other downstream side of the in-feed module 14, the in-feed module 14 is provided with a corresponding number of switches 96b which direct the particular voice and data links for a particular grouping in either direction.

The in-feed module 14 is formed similar to the switchable out-feed connector 22c discussed herein so as to similarly include a connector housing 64 (FIG. 14) and two parallel spaced apart circuit boards 186 disposed therein for connection to opposing terminal blocks 38. The in-feed module 14 feeds all one hundred twenty-eight (128) conductors therein. As illustrated in FIG. 44, the circuit boards 86 are formed similar to the switchable circuit boards 86 of the out-feed connector 22c in that they have switches switch parts 96b mounted to outer faces 76a and 76d of circuit board 186. In wiring the circuit boards 186, the conductors of the in-feed module 14 are connected such that the groupings of data links are controlled by the eight individual switches 96b provided thereon. In the in-feed module 14, the row of pin connectors 98b preferably are connected to the rightward connectors 78a on the circuit board, the center row of pin connectors 100b are electrically connected to the conductors of the main trunk cable 16 and the leftward row of pin connectors 102b are be electrically connected to the contacts 78b on said circuit board.

The switches 96a as illustrated in FIGS. 37–39 are equally usable in the in-feed module 14 wherein placement of each switch 96a on the rows of contact pins 98b and 100b on one hand completes a circuit between the in-feed module 14 and the contacts 78a on the rightward side of the circuit boards 186 such that the particular grouping of voice and data links controlled thereby would be energized in that particular direction and dead or non-energized in the other direction. Thus, that particular grouping of voice and data links could only be tapped off by a out-feed connector 22b or 22c on the appropriate rightward downstream side of the modular communication system 10. On the other hand, by placing a particular switch 96a in contact with the center row of contact pins 100b and the leftward row of contact pins 102b, the electrical circuit would be completed between the in-feed module 14 and the leftward contacts 78b of the in-feed module 14 so as to energize a particular grouping of voice and data links in the leftward downstream direction while leaving the corresponding group of conductors on the rightward side in a dead or a non-energized condition. Thus, each particular grouping 1–8 of voice and data links would be selectively directed either to the left or right downstream side of the in-feed module 14 and the modular communication system 10 would be constructed in accordance therewith.

If desired, it is possible to reroute a particular grouping of voice and data links, for example, from the rightward side to the leftward side due to a change in configuration in the modular communication system 10. When inserting the in-feed module 14 in an intermediate position between two serially adjacent main communication modules 20 within the modular communication system as generally illustrated in FIG. 5, it is desirable that the particular groupings of voice and data links be arranged in the same pattern when travelling either in the right or left direction through the modular communication system 10. More specifically, as seen in FIG. 44, groupings 1 and 2 typically are defined by the contacts 78b on the exterior face 76a of the circuit board 186, the groupings 3 and 4 are defined by the appropriate contacts 78b on the interior face 76b of the circuit board 186. The groupings 5 and 6 are defined by the appropriate contacts 78b on the interior face 76c and the groupings 7 and 8 are defined by the particular contacts 78b on the exterior face 76d such that a particular pattern of the groupings 1–8 is provided and maintained through each main communication module 20 arranged to the left of the in-feed module 14.

However, when viewing the in-feed module 14 from the opposite direction, it is preferable to maintain the same pattern of groupings as illustrated in FIG. 44 for use of the same out-feed connectors 22b and 22c on either side of the in-feed module 14 without having to change the structure thereof. More specifically, to maintain the particular pattern of groupings on both the left and right side as illustrated in FIG. 44, it is necessary that the contacts 78b corresponding to the first grouping of voice and data links be essentially diagonally connected from the face 76a to the face 76d with the contacts 78a thereon which define the same first grouping of voice and data links. In such a manner, all of the groupings 1–8 essentially are diagonally connected to corresponding groupings 1–8 on the opposite edges 74a of the circuit boards 186 and the relative positions of the groupings in the terminal blocks 38 when viewed in a downstream direction is maintained.

To accomplish diagonal interconnections in the preferred embodiment, a connector block 116 is provided on one circuit board 186 which has a plurality of pin receiving bores 118 and a pin block 120 is provided on the opposing circuit board 186 which has a plurality of connector pins 122 protruding therefrom. The aforesaid diagonal interconnections are provided by wiring the appropriate contacts 78 to the connector block 116 and the appropriate contacts 78 on the opposing circuit board 186 to the connector pins 122 in such a manner that the diagonal interconnection maintains the grouping pattern. By selectively setting the switches 96b in the in-feed module 14, the particular groupings 1–8 may be routed as necessary to the particular location of the workstation 12 being served thereby which depends upon the configuration of the wall panels and the office layout.

In operation, selected wall panels 26 are provided each with a predetermined length, main communication module 20 within the raceway 28 thereof such that the terminal blocks 38 are disposed proximate the ends of the wall panels 26. During construction of the particular workstation configuration, the location of the in-feed module 14 is determined such that the in-feed module is connected either to the end terminal block 38 of the end main communication module 20 of the modular communication system 10 or between opposing terminal blocks 38 of mutually adjacent main communication modules 20 which is illustrated more particularly in FIG. 5. The installer then determines the relative locations of the workstations 12 and routes the particular groupings of voice and data links in the proper downstream direction from the in-feed module 14, i.e. groupings 1–6 to the left to serve workstations 1–6, and groupings 7 and 8 to the right, to serve workstations 7 and 8 as indicated by the schematic diagram of FIG. 13A. To complete the connection to each individual workstation 12, a tap-off connector such as 22b or 22c is provided proximate the particular workstation 12 being served thereby as seen in FIG. 2. If the tap-off connector is a dedicated out-feed connector 22b, the particular grouping being assigned to that particular workstation is determined and an appropriate one of the dedicated out-feed connectors 22b is connected between opposing terminal blocks 38. If a switchable out-feed connector 22c is used, the appropriate switch for the appropriate designation for the grouping of voice and data links is switched to the tap-off position while the remainder of switches are set to the pass-through condition. Once one or more of the groupings are tapped off, the corresponding conductors downstream of the tap off location are now dead.

As FIG. 2 illustrates, it is possible that two workstations may be served by one particular out-feed connector such as 22b or 22c either by providing a dedicated out-feed connector 22b having two out-feed cables 84 extending therefrom which are wired to appropriate groupings of contacts 78 or by setting two switches 96 of a switchable out-feed connector 22c to tap off to two out-feed cables 84 which selection depends upon the configuration of the office furniture. Alternatively, to reduce the number of connections in a particular modular communication system 10, it is possible to construct the main communication modules 20 so as to have any predetermined length as illustrated by the main communication module 20A in FIG. 3 which has a length which spans two wall panels 26 and which could be constructed with an even greater length if desired.

In addition, it may be desirable when routing the particular groupings to the particular workstations 12 that a T-type connection may be desired. This may be accomplished by using a connector (not illustrated) wherein the switches thereon have the left row of contact pins 98 connected directly to the left contacts 78b and the right row of contact pins 102 connected to the right contact 78a and the center row of contact pins 100 connected to a T connector cable which extends outwardly therefrom. The T connector cable preferably contains one hundred twenty-eight (128) conductors so that all eight groupings may be routed through this cable. The distal end of the T-connector cable may be formed as half of a pass-through connector or as a terminal block. As such, the groupings may be selectively routed through the T-connector cable or to a main communication module.

Since the plurality of main communication modules 20 which are serially interconnected by the connectors 22 define an elongate arrangement which typically terminates in a terminal block 38 at one end and a terminal block 38 at the other end, these terminating blocks are preferably protected by providing each with a suitable end cap (not illustrated) so as to close off the contact groupings thereof.

In addition, while FIGS. 2–5 illustrate the in-feed module connected to the system at an intermediate connection between adjacent communication modules 20, nevertheless in some instances it may be necessary or desirable to connect an in-feed module to one end of the system, such as at the terminating terminal block 38 as provided at the free end of the system. In such case, the in-feed module shown in FIGS. 2–5 can again be sandwiched between the terminating terminal block and the end cap described above.

While the embodiment of the modular communication system as described herein possesses sixteen telecommunication links disposed in groupings of two links each, it will be appreciated that the number of links and the groupings thereof can be significantly varied depending upon user needs, space limitations, accessibility to the closet, and the like. While each out-feed cable in the connector assembly can access only a single link if desired, nevertheless it is believed more desirable and expedient to access a pair of links since substantially all workstations require separate voice and data links, and the present invention is able to provide this need in a simple and efficient manner. It will be appreciated that any particular workstation can be provided with additional links, if necessary, merely by using two or more tap-off cables or even modules for supplying additional links to the same workstation. Further, it will be recognized that the cables associated with the tap-off modules are sufficiently small and flexible as to enable the cables and the tap-off plugs thereon to be bent so as to be plugged into a workstation on either side of the connector, if desired or necessary.

It will also be understood that the construction and interconnection of the wall panels, as well as the provision of a raceway in association therewith for accommodating the communication system, may assume many different conventional constructions as are well known in the office furniture industry. For example only, however, attention is directed to U.S. Pat. Nos. 4,060,294, 4,080,366, and 4,277,123, all owned by the Assignee hereof, for showing examples of such panels and of the construction thereof.

Reference will now be made to FIGS. 45–56 which are diagrammatic plan views which illustrate several arrangements and variations of the modular communication system of this invention. In these views, the reference to the "data distribution assembly" refers to the modular communication system, reference to "data tap" means the tap-off module, with the "in-line" data tap being a tap-off module which connects directly into the aligned modules of the system, the reference to the "data distribution segments" mean the main distribution modules, the reference to "quick connectors" mean the connector units, the reference to a "data feed" means the in-feed module, with the "one-way" data feed being connectable at an end or location so that the telecommunication links project only in one direction downstream therefrom, whereas the "two-way" data feed connects intermediate the length of the system so that selected telecommunication links project in opposite directions therefrom. In these drawings, reference is also made to a "data T", this being a connector which is provided as an integral part of the distribution segment and which cooperates with the data taps.

In the modules diagrammatically illustrated in FIGS. 45–56, the connectors as well as the taps and data feeds are all provided with housings which each possess male and female characteristics so that when two such housings join together as illustrated in the drawings, the male-female parts on one housing respectively mate with the female-male parts on the other housing to provide a quick connect-disconnect between adjacent modules. Such connections in terms of the way in which they interfit to define a nonhanded relationship, are themselves well known. The connections, namely the male-female properties associated with the housings thereof, do not effect the contact connections, which contact connections can be generally in accordance with those which have been described above. In this case, however, where the tap-offs have a housing or plug part which plugs either directly in-line or into a separate data T, the connectors no longer need to provide access ports.

It should further be noted that the line diagrams associated with FIGS. 45–56 show only six telecommunication links (i.e. data paths) for purposes of illustration, but the number of such links can obviously be varied as desired, including eight links as described above relative to the variations previously described.

Figure 45A:
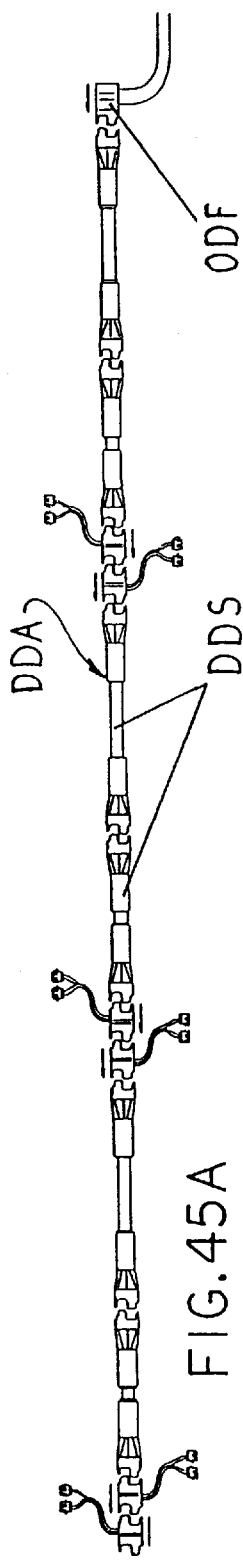
Figure 45B:
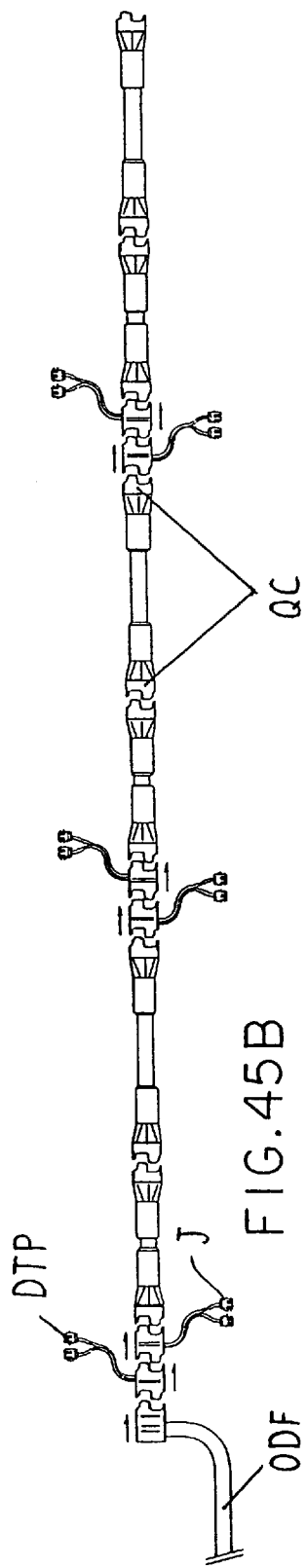
Figure 45C:
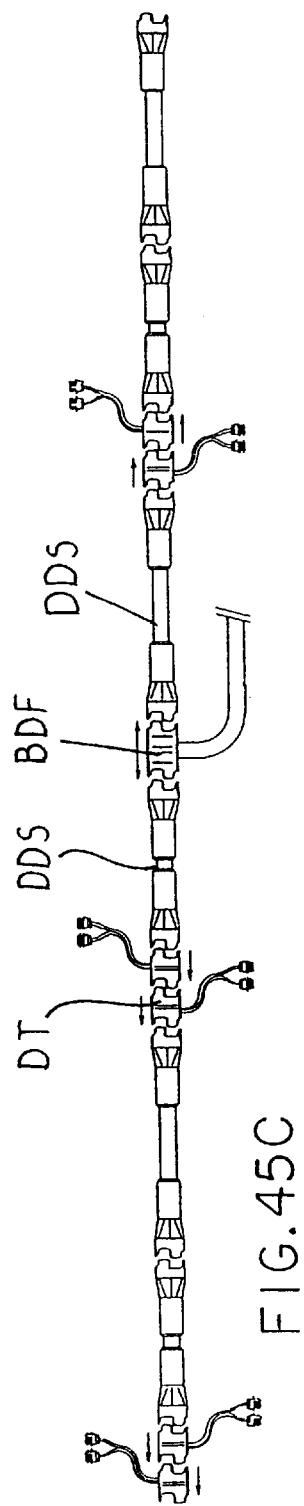

More particularly, a data distribution assembly DDA with in-line data taps DTP and one-way data feeds ODF is illustrated in FIGS. 45A, 45B and 45C. Referencing FIGS. 45A, 45B and 45C, the data distribution assembly DDA includes data distribution segments DDS which have a length equal to a panel length, are pre-wired with connectors attached thereto and are preassembled with a panel. Additionally, the one-way data feed ODF is illustrated in FIG. 45A at the right end thereof although it may be located at either end of the assembly. FIG. 45B illustrates a similar data feed ODF at the opposite end of the assembly which extends to a computer/telephone closet. Quick connectors QC are provided on the data distribution segments DDS and in-line data taps DTP are provided for voice and data with pre-terminated jacks J at the ends thereof. FIG. 45C illustrates the configuration and layout of the modular cabling system with in-line data taps DTP and a bi-directional data feed BDF which may be located anywhere along the length of the data distribution assembly DDA between two serially-adjacent data distribution segments DDS. The bi-directional data feed BDF extends to the computer/telephone closet.

Figure 46A:
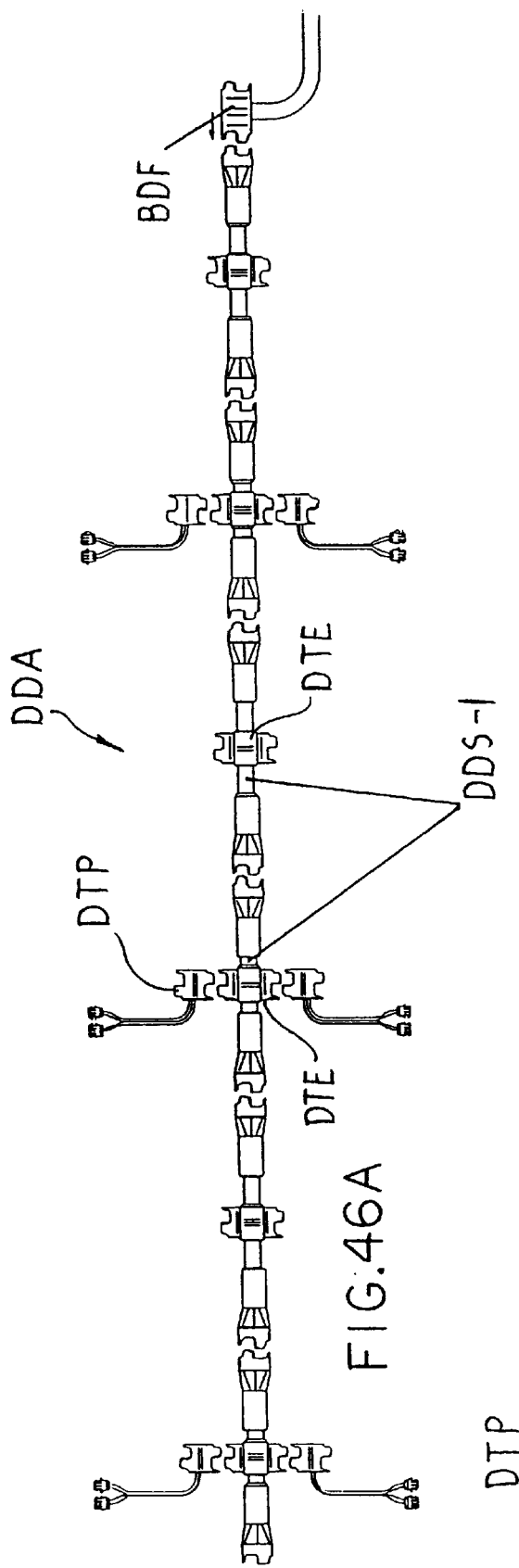
FIGS. 46A and 46B illustrate the data distribution assembly similar to FIGS. 45A–45C except that the distribution segments (i.e., the distribution module) incorporate intermediate tap-off connectors referred to as data T's, with FIG. 46A showing the data feed at one end of the system and FIG. 46B showing the data feed intermediate the length thereof.
Figure 46B:
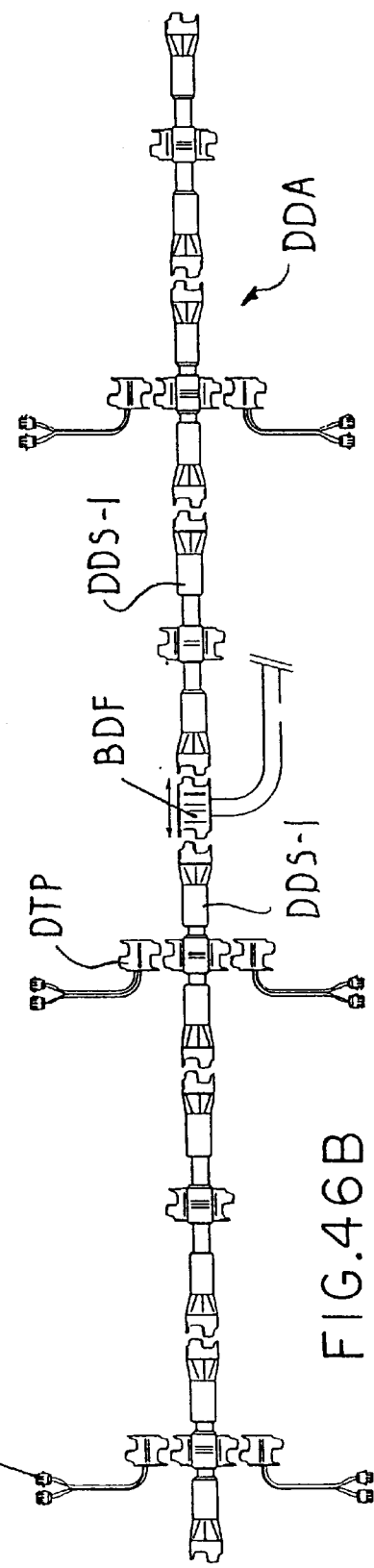

In FIGS. 46A and 46B, a data distribution segment DDS-1 with data T's DTE is illustrated where the data taps DTP connect to data T's DTE rather than in-line as in previous FIGS. 45A, 45B and 45C. The benefit is that individual users can connect and disconnect without disrupting other users. In FIG. 46A, the bi-directional data feed BDF is illustrated at the rightward end of the data distribution assembly DDA and extends to a telephone/computer closet. FIG. 46B illustrates the bi-directional data feed BDF connected between two serially-adjacent data distribution segments DDS-1 and extending to the telephone/computer closet. The data taps DTP are pre-terminated and accommodate voice and data.

Figure 47A:
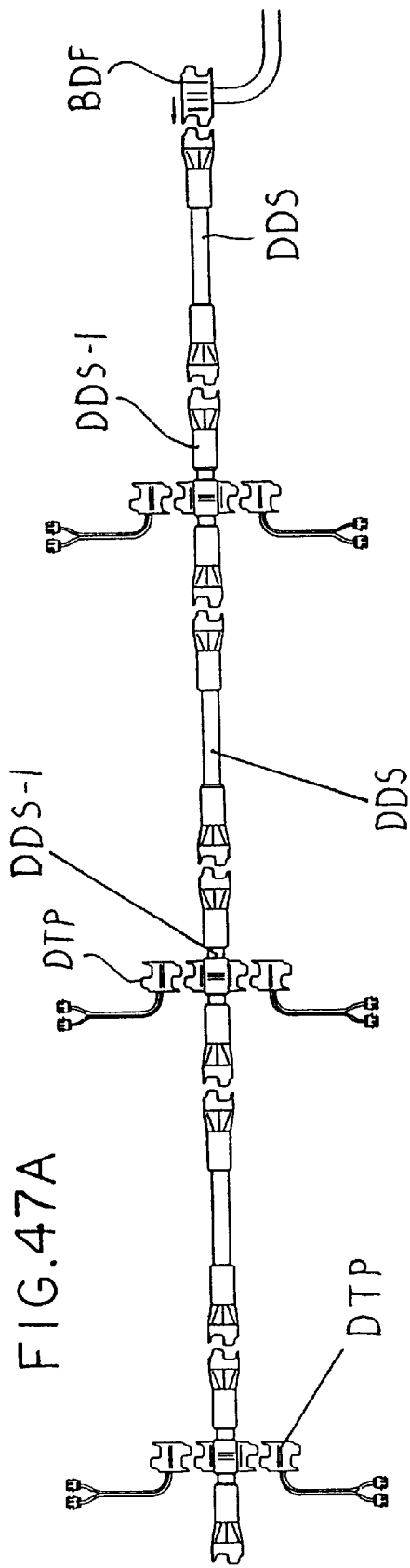
FIGS. 47A and 47B illustrate similar views of the data distribution assembly showing various combinations of the features of FIGS. 45A–45C and 46A–46B.
Figure 47B:
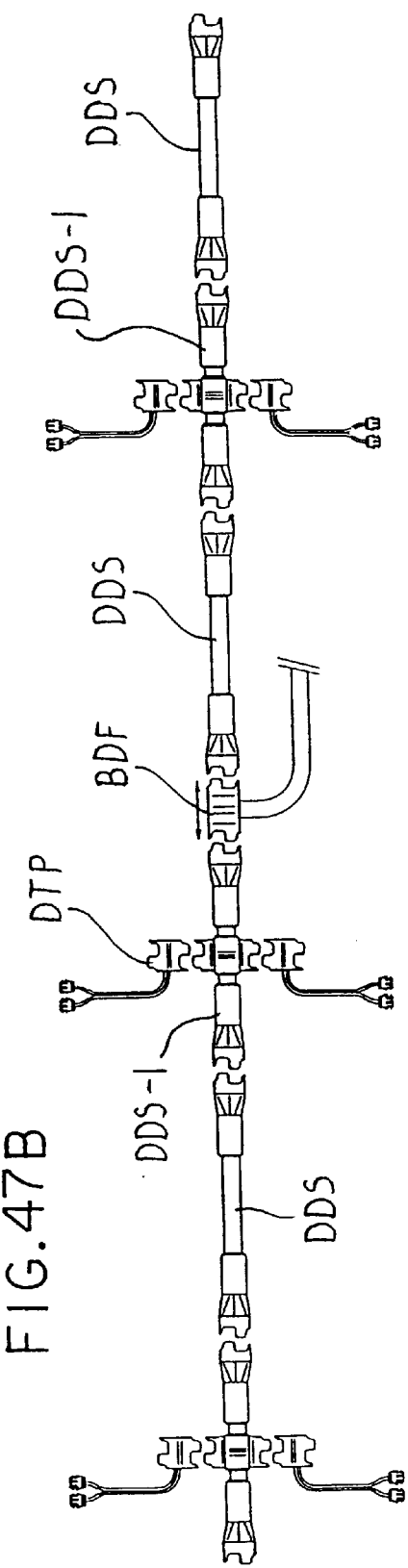

FIGS. 47A and 47B illustrate a combinational data distribution assembly where the data distribution segments come in two versions, namely, one version DDS-1 having data T's for connection of data taps and another version DDS for pass-through only. Data taps DTP are illustrated which connect to those data distribution segment DDS-1 having the data T therein. FIG. 47A also illustrates one of the pass-through data distribution segments DDS disposed serially between two of the data distribution segments DDS-1 which have data T's. FIG. 47B illustrates a bi-directional data feed BDF connected to the assembly.

Figure 48A:
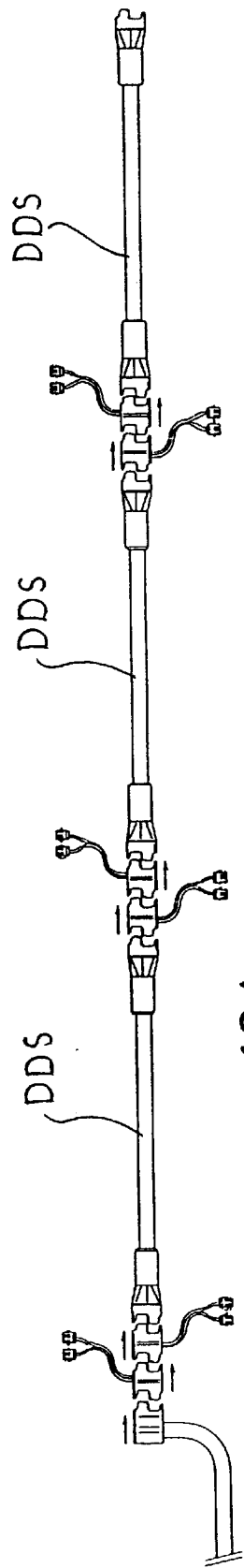
FIGS. 48A and 48B show the data distribution assembly employing extended length data distribution segments (i.e., main distribution modules), with FIGS. 48A and 48B showing different combinations of features.
Figure 48B:
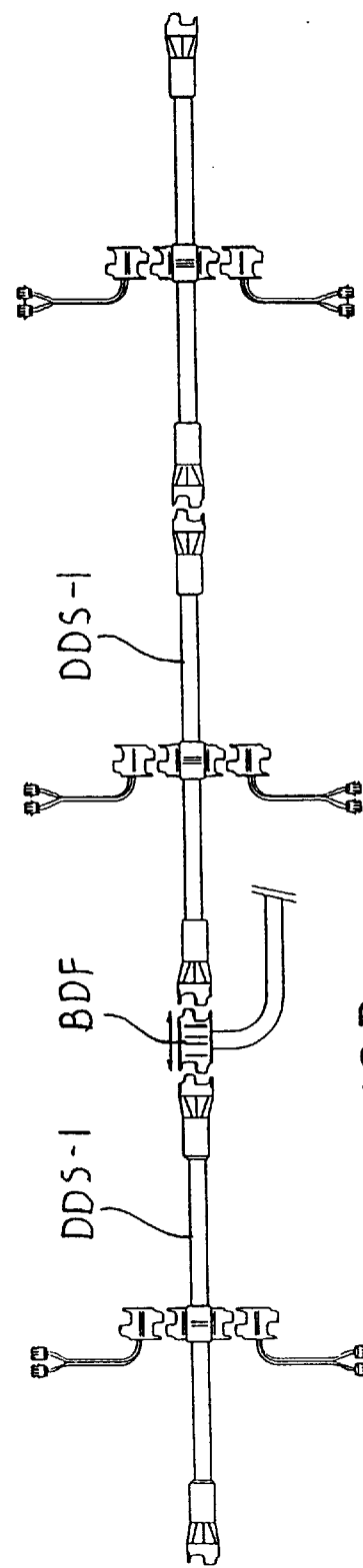

FIGS. 48A and 48B illustrate extended length data distribution segments DDS which are longer in length and run the length of two or more panels. The extended length data distribution segments DDS may be based on office size rather than panel size. FIG. 48A illustrates a data feed at the leftward end of the system while FIG. 48B illustrates the bi-directional data feed BDF between two serially-adjacent distribution segments DDS-1.

FIGS. 49A and 49B illustrate a data distribution segment DDS having such features as a length based on panel or furniture component size, a non-handed design (genderless connectors), quick connectors QC on opposite ends for attachment to other segments, feeds or taps, integral strain relief, pre-attachability to furniture-like power systems, and a capacity to service voice and data requirements for a minimum of six offices.

FIGS. 50A and 50B illustrate an in-line data tap DTP which has such features as the ability to access and terminate desired data paths, provide pass-through of all other paths, quick connectors on both ends for attachment to distribution segments, feeds or other taps, pre-terminated modular connectors for computer and phone attachment, and integral strain relief. This in-line data tap DTP must be oriented in a proper direction as illustrated by the reference arrow in FIG. 50A. More particularly, the in-line data tap DTP provides integral strain relief with cables formed of two four-pair UTP cables CB having a siamese configuration and a length which is predetermined. The strain relief is provided near the opposite ends of the cables CB. The two modular jacks J are provided for voice and for data.

Figure 51B:
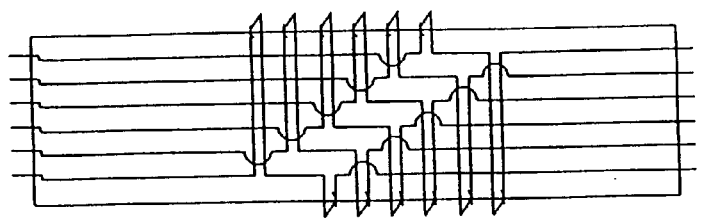
FIGS. 51A and 51B relate to the distribution segment incorporating a data T therein, with FIG. 51A showing the structure thereof and FIG. 51B being a line diagram of the internal telecommunication links.
Figure 51A:
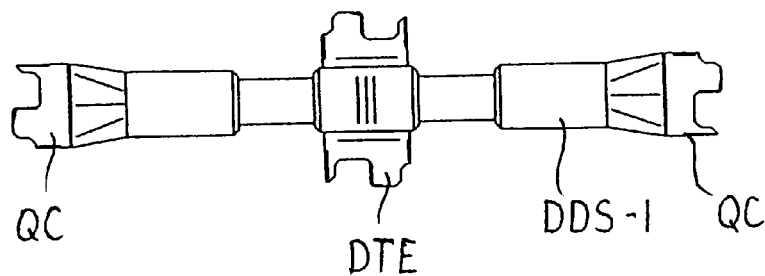

FIGS. 51A and 51B illustrate a data distribution segment DDS-1 with a data T DTE for attachment of data taps DTP. This data distribution segment DDS-1 incorporates such features as a length based on panel or furniture component size, a non-handed design (genderless connectors), quick connectors QC on both ends for attachment to other segments, feeds or taps, integral strain relief, pre-attachability to furniture-like power system, a capacity to service voice and data requirements for six offices minimum, and T connectors for attachment of data taps. Insertion of a data tap DTP breaks the continuation of the path therethrough while orientation of the inserted data tap DTP determines the direction of the signal path.

Figure 52A:
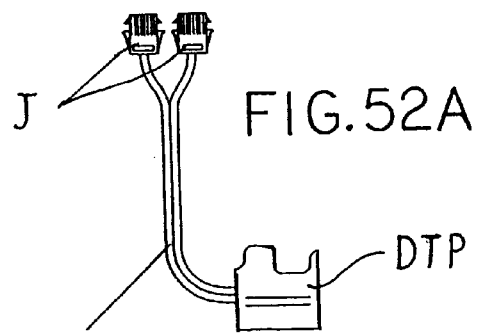
FIGS. 52A and 52B relate to a data tap of the type which cooperates with a data T, with FIG. 52A showing the structure of the tap and FIG. 52B being a line diagram of the telecommunication link which passes therethrough.
Figure 52B:
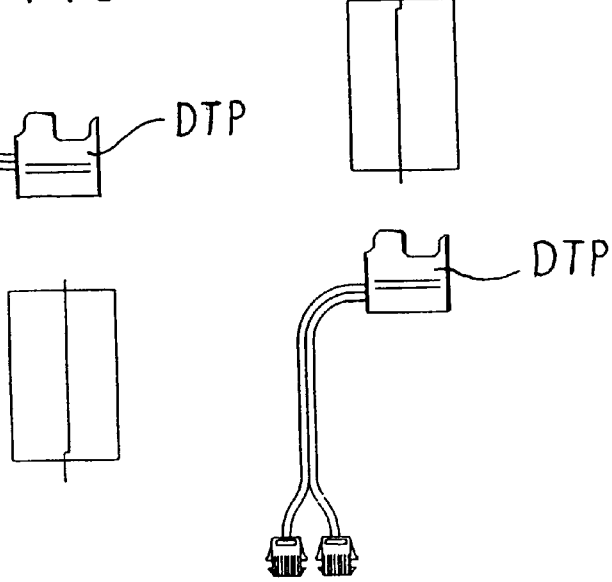

FIGS. 52A and 52B illustrate a data tap DTP which uses two modular jacks J for voice and data respectively, and two four-pair UTP cables CB with a siamese configuration and a predetermined length. The cables provide integral strain relief while the data tap DTP incorporates such features as providing access and terminations to desired data paths, orientation of data tap DTP determines direction of data path and data distribution segment, pre-terminated modular connectors or jacks J for computer and phone attachment, and providing integral strain relief.

Figure 53A:
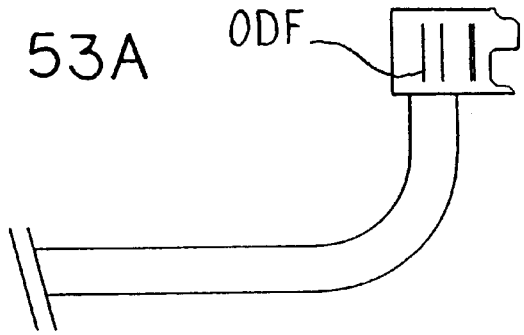

FIGS. 53A and 53B illustrate a one-way data feed ODF which provides integral strain relief and a connection between a data distribution assembly and the computer/telephone closet. The one-way data feed ODF connects the building cabling to the data distribution assembly with the length and configuration of the closet end of the data feed ODF being provided as necessary. The data feed ODF has the capacity to service voice and data requirements for a minimum of six offices and must be attached to either end of the data distribution assembly since it is not constructed for connection in the middle of a run of data distribution assemblies.

FIGS. 54A and 54B illustrate a bi-directional data feed BDF for connection between the data distribution assembly and the computer/telephone closet while providing integral strain relief. Here again, the building cabling is connected to the data distribution assembly with the length and configuration of the closet end of the data feed BDF to be determined. This data feed BDF provides a six office capacity for voice and data requirements and may be located anywhere along the length of the data distribution assembly with the direction of each data path being selectable for proper routing of signals to desired offices.

Figure 55B:
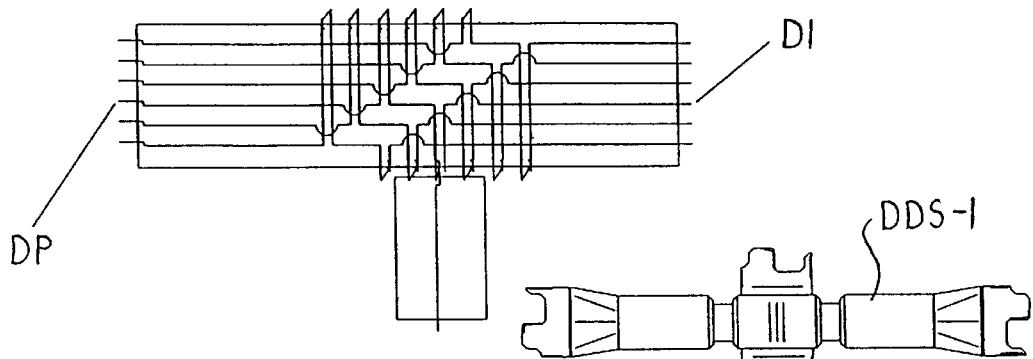
FIGS. 55A and 55B diagrammatically illustrate the connection of a data tap to a distribution segment, and specifically
Figure 55A:
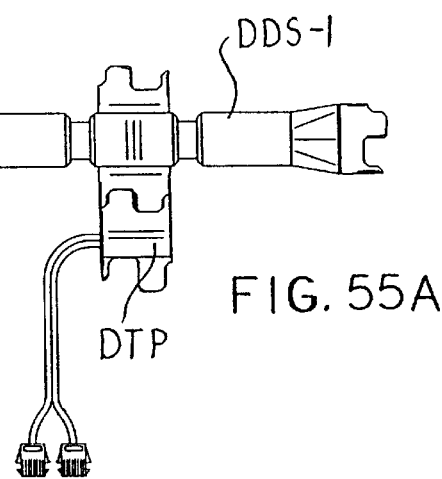

FIGS. 55A and 55B illustrate a data distribution segment DDS-1 with a data tap DTP attached where a data path DP is accessed by the data tap DTP and the data path DP is discontinued in the direction D1 away from the data tap DTP.

FIG. 56 illustrates a typical layout and configuration of the modular cabling system MCS illustrating a data distribution assembly DDA diagrammatically represented as providing data taps DTP for voice and data to six separate work station areas W which data distribution assembly DDA is connected at the rightward end to a data feed ODF as discussed above.

While the modular communication system of this invention has been described above in conjunction with a wall system defined by portable upright space-dividing panels, it will be appreciated that the modular communication system of this invention also has significant capability for use with other components, particularly furniture components, and can, for example, be provided for use on a series of linking desks or worksurfaces. This modular communication system is also highly desirable for use in a beam-type space-dividing arrangement, such type arrangement being illustrated by U.S. Pat. No. 5,236,370.

Attention is also directed to copending U.S. application Ser. No. 08/377,743, filed on Jan. 25, 1995, inventors Harold Wilson and Ross Johnson, and entitled "MODULAR COMMUNICATION CABLING SYSTEM" (Attorney Reference: Haworth Case 164). The disclosure of this latter-mentioned copending application is incorporated herein, in its entirety, by reference.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an office furniture arrangement including a plurality of upright space-dividing wall panels interconnected to define a plurality of adjacent workstations, said plurality of panels including a series of panels which are positioned generally end-to-end in the lengthwise direction thereof to define a main panel run, the panels of said run defining therein a raceway which extends lengthwise thereof, and a telecommunication cabling arrangement disposed in said raceway for providing access to telecommunication links from workstations disposed adjacent said panels, the improvement comprising:

said telecommunication cabling arrangement being of modular construction and defined by a plurality of elongate main distribution modules which serially couple together and extend throughout the raceways defined by said run of panels, each said main distribution module including an elongate intermediate cable having a multi-conductor terminal unit at each end thereof, said cable defining a plurality of multi-conductor telecommunication links extending longitudinally therethrough and terminating at the terminal units provided at opposite ends thereof, each said terminal unit having a plurality of conductor contacts corresponding to the number of telecommunication links;

the terminal units as provided on adjacent ends of two said distribution modules being fixedly coupled together by connector units engaged serially therebetween so that the conductor contacts on one terminal unit respectively operatively communicate with the individual conductor contacts on the other terminal unit for permitting said plurality of multi-conductor telecommunication links to be transmitted longitudinally along said telecommunication cabling arrangement;

at least one of said connector units being a tap-off module having access means communicating with the conductor contacts of the terminal units defining one said telecommunications link for accessing at least one, but less than all, of the telecommunication links which extend throughout the interconnected distribution modules; and said tap-off module also including a cable connected to the access means and projecting away therefrom and being provided with an outlet connected to the other end thereof, said cable defining a multi-conductor telecommunication link for connecting said outlet to said one telecommunication link in communication with said access means.

2. An arrangement according to claim 1, wherein said tap-off module is dedicated, said access means being in communication with a predetermined one of said telecommunication links.

3. An arrangement according to claim 1, wherein said tap-off module is switchable, said access means being in communication with a selected one of said telecommunications links.

4. An arrangement according to claim 1, wherein each access means accesses two different but dedicated telecommunication links.

5. An arrangement according to claim 1, wherein said access means breaks said one telecommunication link so that said one telecommunication link is dead downstream of the tap-off point.

6. An arrangement according to claim 5, including an in-feed module connected to one of said terminal units for supplying said plurality of telecommunication links to the interconnected distribution modules, said in-feed module having a remote end adapted for connection to the telecommunication closet.

7. An arrangement according to claim 6, wherein the in-feed module is serially connected between the adjacent terminal units of two interconnected distribution modules.

8. An arrangement according to claim 1, including an in-feed module connected to one of said terminal units for supplying said plurality of telecommunication links to the interconnected distribution modules, said in-feed module having a remote end adapted for connection to a telecommunication closet.

9. In a telecommunication cabling arrangement, the improvement comprising:

said telecommunication cabling arrangement being of modular construction and defined by a plurality of elongate main distribution modules which serially couple together, each said main distribution module including an elongate intermediate cable having a multi-conductor terminal unit at each end thereof, said cable defining a plurality of multi-conductor telecommunication links extending longitudinally therethrough and terminating at the multi-conductor terminal units provided at opposite ends thereof, each said terminal unit having a plurality of conductor contacts corresponding to the number of telecommunication links;

the terminal units as provided on adjacent ends of two said distribution modules being serially coupled together by connector units removably engaged therebetween in series so that the conductor contacts on one terminal unit respectively operatively communicate with the individual contacts on the other terminal unit for permitting said plurality of telecommunication links to be transmitted longitudinally along the telecommunication cabling arrangement;

at least one of said connector units being a tap-off module having access means communicating with the conductor contacts of the terminal units defining one said telecommunications link for accessing at least one, but less than all, of the telecommunication links which extend throughout the interconnected distribution modules; and said tap-off module also including an outlet connected to the access means, said outlet defining a multi-conductor telecommunication link which is connected to said one telecommunication link in communication with said access means.

10. An arrangement according to claim 9, wherein said tap-off module is dedicated, said access means being in communication with a predetermined one of said telecommunication links.

11. An arrangement according to claim 9, wherein said tap-off module is switchable, said access means being in communication with a selected one of said telecommunication links.

12. An arrangement according to claim 9, wherein each access means accesses two different telecommunication links.

13. An arrangement according to claim 9, wherein said access means breaks said one telecommunication link so that said one telecommunication link is dead downstream of the tap-off point.

14. An arrangement according to claim 13, including an in-feed module connected to one of said terminal units for supplying said plurality of telecommunication links to the interconnected distribution modules, said in-feed module having a remote end adapted for connection to a telecommunication closet.

15. An arrangement according to claim 14, wherein the in-feed module is serially connected between the adjacent terminal units of two said interconnected distribution modules.

16. An arrangement according to claim 9, including an in-feed module connected to one of said terminal units for supplying said plurality of telecommunication links to the interconnected distribution modules, said in-feed module having a remote end adapted for connection to a telecommunication closet.

17. In an office furniture arrangement including a plurality of upright space-dividing wall panels interconnected to define a plurality of adjacent workstations, said plurality of panels including a series of panels which are positioned generally end-to-end in the lengthwise direction thereof to define a main panel run, the panels of said run defining therein a raceway which extends lengthwise thereof, and a telecommunication cabling arrangement disposed in said raceway for providing access to telecommunication links from workstations disposed adjacent said panels, the improvement comprising:

said telecommunication cabling arrangement being of modular construction and defined by a plurality of main distribution modules which serially couple together and extend throughout the raceways defined by said run of panels, each said main distribution module including an intermediate cable defining a plurality of multi-conductor telecommunication links extending longitudinally therethrough and terminating at terminal units provided at opposite ends thereof;

the terminal units as provided on adjacent ends of two said distribution modules being fixedly coupled together by connector means removably engaged serially therebetween for permitting said plurality of multi-conductor telecommunication links to be transmitted longitudinally along the arrangement;

said connector means having access means in communication with said cabling arrangement at selected sites thereon for accessing at least one, but less than all, of the telecommunication links which extend throughout the distribution modules, and an outlet connected to the access means by conductors connected therebetween, said conductors defining a multi-conductor telecommunication link for connecting said outlet to said one telecommunication link in communication with said access means; and an in-feed module connected to one of said terminal units for supplying said plurality of telecommunication links to the interconnected distribution modules, said in-feed module having a remote end adapted for connection to a telecommunication closet.

18. An arrangement according to claim 17, wherein the in-feed module is serially connected between the adjacent terminal units of two interconnected distribution modules.

19. An arrangement according to claim 17, wherein said in-feed module is connected between at least two serially adjacent main distribution modules and is switchable to selectively route each said telecommunication link to a selected adjacent one of said main distribution modules downstream from said in-feed module.

20. An arrangement according to claim 19, wherein said in-feed modules includes a circuit board adapted to define a circuit pattern for said telecommunication links of each adjacent said main distribution module.

21. In a telecommunication cabling arrangement, the improvement comprising:

said telecommunication cabling arrangement being of modular construction and defined by a plurality of elongate main distribution modules which serially couple together, each said main distribution module including an elongate intermediate cable having a multi-conductor terminal unit at each end thereof, said cable defining a plurality of multi-conductor telecommunication links extending longitudinally therethrough and terminating at the multi-conductor terminal units provided at opposite ends thereof, each said terminal unit having a plurality of conductor contacts corresponding to the number of telecommunication links;

the terminal units as provided on adjacent ends of two said distribution modules being serially coupled together by a connector unit releasably engaged therebetween so that the individual conductor contacts on one terminal unit respectively operatively communicate with the individual conductor contacts on the other terminal unit for permitting said plurality of telecommunication links to be transmitted longitudinally along the telecommunication cabling arrangement;

said connector unit being a tap-off module having access means communicating with the conductor contacts of the terminal units defining one said telecommunications link for accessing at least one, but less than all, of the telecommunication links which extend throughout the interconnected distribution modules, said access means breaking said one telecommunication link so that said one telecommunication link as it extends throughout the interconnected distribution modules is dead downstream of the tap-off point; and said tap-off module also including conductors connected at one end thereof to the access means and connected with an outlet at the other end thereof for connection to a communication device, said conductors defining a multi-conductor telecommunication link for connecting said outlet to said one telecommunication link accessed by said access means.

22. An arrangement according to claim 21, wherein said tap-off module is switchable so that said access means can be disposed in communication with a selectable one of said telecommunication links.

23. An arrangement according to claim 21, including an in-feed module connected to one of said terminal units for supplying said plurality of telecommunication links to the interconnected distribution modules, said in-feed module having a remote end adapted for connection to a telecommunication closet.

24. An arrangement according to claim 23, wherein said in-feed module is releasably connected between two serially adjacent main distribution modules and includes switching to selectively route each said telecommunication link to a selected adjacent one of said main distribution modules downstream from said in-feed module.

25. In a telecommunication cabling arrangement, the improvement comprising:

said telecommunication cabling arrangement being of modular construction and defined by a plurality of elongate main distribution modules which serially couple together, each said main distribution module including an elongate intermediate cable having a multi-conductor terminal unit at each end thereof, said cable defining a plurality of multi-conductor telecommunication links extending longitudinally therethrough and terminating at the multi-conductor terminal units provided at opposite ends thereof, each said terminal unit having a plurality of conductor contacts corresponding to the number of telecommunication links;

the terminal units as provided on adjacent ends of two said distribution modules being serially coupled together by an in-feed module releasably engaged therebetween for supplying said plurality of telecommunication links to the interconnected distribution modules, said in-feed module having a remote end adapted for connection to a telecommunication closet;

said in-feed module including switching to selectively route each said telecommunication link to a selected adjacent one of said main distribution modules downstream from said in-feed modules while breaking said one telecommunication link so that said one telecommunication link as it extends through the other adjacent main distribution module is dead.

26. An arrangement according to claim 25, wherein said in-feed module includes first and second end terminals which are each adapted respectively for releasable engagement with a terminal unit of a said main distribution module for permitting said main distribution modules to extend downstream in opposite directions from said in-feed module, each said end terminal having a plurality of contacts associated therewith corresponding to said plurality of telecommunication links, and said switching as associated with each said one telecommunication link including first and second conductors which are respectively joined to the contacts of said one telecommunication link respectively associated with said first and second end terminals, and a third conductor which connects to said one telecommunication link as supplied to said in-feed module from the telecommunication closet, said first, second and third conductors normally being isolated from one another, and said switching also including a movable switch part which is selectively movable from a first position wherein it is engaged with said first and third conductors so that said one telecommunication link is supplied solely to said first end terminal, and a second position wherein it is engaged with said second and third conductors so that said one telecommunication link is supplied solely to said second end terminal.

27. A telecommunications and data connector arrangement comprising:

a first distribution module comprising an elongate first cable and a first terminal block having first contact elements connected to one end of said cable, said first contact elements and said first cable defining a plurality of telecommunications links adapted to transmit telecommunications signals therethrough;

a second distribution module comprising an elongate second cable and a second terminal block having second contact elements which correspond to said first contact elements and are connected to one end of said second cable, said second contact elements and said second cable defining a plurality of telecommunications links adapted to transmit telecommunications signals therethrough; and a connector unit having first and second connector sections removably connected to said first and second terminal blocks so that said connector unit is engaged serially between said first and second terminal blocks, said connector unit including tap-off means which include an outlet and conductors which connect said outlet to one or more but less than all of said first contact elements for accessing at least one of said telecommunications links, and pass-through conductors connected to the other of said first contact elements and to said second contact elements corresponding thereto for connecting the other of said telecommunications links to said corresponding telecommunications links of said second distribution module.

28. The connector arrangement according to claim 27, wherein said telecommunication links transmit both data and voice signals.

29. The connector arrangement according to claim 27, wherein said tap-off means prevents connection between said at least one telecommunications link of said first distribution module and said corresponding telecommunication link of said second distribution module.

30. The connector arrangement according to claim 29, wherein said connector unit is connectable to said first and second terminal blocks respectively in a first position such that said tap-off means is connected to a first one of said telecommunications links while a second one of said telecommunication links is connected to said pass-through means, or in a second position such that said tap-off means is connected to said second one of said telecommunication links and said pass-through means is connected to said first one of said telecommunication links.

31. The connector arrangement according to claim 30, wherein said connector unit is rotated about an axis thereof between said first and second positions.

32. The connector arrangement according to claim 27, wherein said first and second terminal blocks each include an open socket in which said first and second contact elements are disposed respectively, said connector unit including first and second engagement parts which are insertable respectively within said open sockets of said first and second terminal blocks so as to be serially connected together.

33. The connector arrangement according to claim 32, wherein said first and second engagement parts include third and fourth contact elements connect to said first and second contact elements respectively, said pass-through means being connected serially between a corresponding group of said third and fourth contact elements so that said other of said telecommunications links is connected therebetween, and said tap-off means being connected to said third contact elements.

34. The connector arrangement according to claim 33, wherein said connector unit includes a circuit board which defines said first and second engagement parts on opposite ends thereof, said opposite ends adapted to be removably engaged within said sockets and respectively including said third and fourth contact elements on an exterior surface thereof.

35. The connector arrangement according to claim 27, wherein said first and second terminal blocks each include at least one socket having said respective first and second contact elements therein, each said socket having parallel side edges along which parallel rows of said contact elements are arranged, each of said first and second terminal blocks including layers of ribbon cable joined together which said layers are connected to a respective one of said rows of said contact elements.

36. The connector arrangement according to claim 27, wherein said first and second connector sections are connected to said first and second terminal blocks respectively for accessing said telecommunication links of said first distribution module, or to said second and first terminal blocks respectively for accessing said telecommunication links of said second distribution module.

37. A telecommunications and data connector arrangement comprising:

first and second distribution modules each comprising an elongate cable and a terminal block which has a plurality of contact elements disposed therein which are connected to said cable to define a plurality of telecommunications links adapted to transmit telecommunication signals therethrough, each of said first and second distribution modules defining a predetermined number of said telecommunications links; and an intermediate connector unit having first and second connector sections for joining said connector units serially between said first and second terminal blocks to join said first and second distribution modules together, said first and second connector sections of said connector unit and said terminal blocks of said first and second distribution modules having cooperating parts wherein said connector unit in a first position has said first and second connector sections connected to said first and second distribution modules and in a second position has said first and second connector sections removably connected to said second and first distribution modules respectively, said connector unit being connected to one of an inlet means or outlet means for providing telecommunication signals to or receiving telecommunication signals from said connector unit, said connector unit further including a plurality of conductors therethrough which connect to said one of said inlet means or said outlet means and are disposed in said first connector section, said plurality of conductors being connected to corresponding ones of said contact elements of said first distribution module when said connector unit is in said first position or said second distribution module when said connector unit is in said second position such that said one of said inlet means or said outlet means is connected to one or more of said telecommunications links defined by said contact elements whereby said one of said inlet means or said outlet means is connectable to one or more of said telecommunication links of either of said first and second distribution modules.

38. The connector arrangement according to claim 37, wherein said connector unit includes a second plurality of conductors which extend between said first and second connector sections for connecting one or more of said telecommunications of said first and second distribution modules together when said connector unit is in either said first position or said second position.

39. The connector arrangement according to claim 37, wherein said connector unit includes switch means for selectively switching the connection of said conductors to either said contact elements of said first and second distribution modules as said connector unit is disposed in said first position.

* * * * *

UNITED STATES PATENT AND TRADEMARK OFFICE
CERTIFICATE OF CORRECTION

PATENT NO. : 5 957 714
DATED : September 28, 1999
INVENTOR(S) : Ross JOHNSON et al It is certified that error appears in the above-identified patent and that said Letters Patent is hereby corrected as shown below:

Column 22, line 5; change "the" to ---a---.
line 9; after "two" insert ---said---.

Signed and Sealed this

Fifth Day of September, 2000

Attest:

Attesting Officer

Q. TODD DICKINSON
Director of Patents and Trademarks